(12) United States Patent
Watanabe et al.

(10) Patent No.: US 12,546,742 B2
(45) Date of Patent: Feb. 10, 2026

(54) GAS SENSOR

(71) Applicant: NGK INSULATORS, LTD., Nagoya (JP)

(72) Inventors: Yusuke Watanabe, Nagoya (JP); Daichi Ichikawa, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 303 days.

(21) Appl. No.: 18/489,302

(22) Filed: Oct. 18, 2023

(65) Prior Publication Data
US 2024/0133840 A1  Apr. 25, 2024
US 2024/0230583 A9  Jul. 11, 2024

(30) Foreign Application Priority Data
Oct. 21, 2022  (JP) ................ 2022-169086

(51) Int. Cl.
*G01N 27/409* (2006.01)
*G01N 27/12* (2006.01)
(Continued)

(52) U.S. Cl.
CPC .......... *G01N 27/409* (2013.01); *G01N 27/12* (2013.01); *G01N 27/301* (2013.01); *G01N 27/41* (2013.01);
(Continued)

(58) Field of Classification Search
CPC .... G01N 27/409; G01N 27/12; G01N 27/301; G01N 27/41; G01N 27/419; G01N 33/0037; G01N 27/4067; G01N 27/4071
See application file for complete search history.

(56) References Cited

U.S. PATENT DOCUMENTS 8,603,310 B2 * 12/2013 Ishida ................ G01N 27/419
                                                   204/425
9,683,926 B2 *  6/2017 Miyai ................ G01N 1/2252
(Continued)

FOREIGN PATENT DOCUMENTS

JP          5021697 B2     9/2012
JP          5918177 B2     5/2016
JP       2022-091669 A     6/2022

*Primary Examiner* — Freddie Kirkland, III
(74) *Attorney, Agent, or Firm* — MATTINGLY & MALUR, PC

(57) ABSTRACT

A gas sensor includes a sensor element including an element body, a measurement pump cell including an inner measurement electrode, an adjustment pump cell including an inner adjustment electrode and a reference electrode, a control apparatus that performs an adjustment pump control process of adjusting the oxygen concentration in the oxygen concentration adjustment chamber so that an adjustment voltage reaches an adjustment voltage target value, and a measurement pump control process of pumping out oxygen in the measurement chamber so that a measurement voltage reaches a measurement voltage target value. The control apparatus detects the specific gas concentration in the measurement-object gas based on a measurement pump current, and the control apparatus detects a water concentration in the measurement-object gas based on a change in the measurement pump current when at least one of the adjustment voltage target value or the measurement voltage target value is changed.

6 Claims, 7 Drawing Sheets

(51) Int. Cl.
  *G01N 27/30*   (2006.01)
  *G01N 27/41*   (2006.01)
  *G01N 27/419*  (2006.01)
  *G01N 33/00*   (2006.01)
  *G01N 27/406*  (2006.01)

(52) U.S. Cl.
  CPC ....... *G01N 27/419* (2013.01); *G01N 33/0037* (2013.01); *G01N 27/4067* (2013.01)

(56) References Cited

U.S. PATENT DOCUMENTS

| | | | |
|---|---|---|---|
| 12,366,565 B2* | 7/2025 | Watanabe | G01N 27/4074 |
| 12,372,493 B2* | 7/2025 | Okamoto | G01N 27/41 |
| 12,372,494 B2* | 7/2025 | Okamoto | G01N 27/4065 |
| 2011/0290015 A1 | 12/2011 | Ishida et al. | |
| 2015/0034484 A1 | 2/2015 | Nakasone et al. | |
| 2022/0178869 A1 | 6/2022 | Okamoto et al. | |
| 2022/0283114 A1* | 9/2022 | Okamoto | G01N 27/41 |
| 2022/0299464 A1* | 9/2022 | Okamoto | G01N 27/4175 |

\* cited by examiner

GAS SENSOR

CROSS-REFERENCE TO RELATED APPLICATION

The present application claims priority from Japanese Patent Application No. 2022-169086 filed on Oct. 21, 2022, the entire contents of which are incorporated herein by reference.

BACKGROUND OF THE INVENTION

1. Field of the Invention

The present invention relates to a gas sensor.

2. Description of the Related Art

Hitherto, a gas sensor that detects the concentration of a specific gas, such as NOx, in a measurement-object gas, such as the exhaust gas of an automobile, is known. For example, PTL 1 describes a gas sensor comprising: an element body which includes an oxygen-ion-conductive solid electrolyte layer, and is internally provided with a measurement-object gas flow portion that introduces a measurement-object gas and causes the measurement-object gas to flow therethrough; and a plurality of electrodes disposed in the element body. When the concentration of NOx is detected by the gas sensor, pumping-out or pumping-in of oxygen is first performed between an oxygen concentration adjustment chamber of the measurement-object gas flow portion, and the outside of a sensor element, and the oxygen concentration in the oxygen concentration adjustment chamber is adjusted. The measurement-object gas with the oxygen concentration adjusted reaches a measurement chamber provided downstream of the oxygen concentration adjustment chamber of the measurement-object gas flow portion. In the measurement chamber, the NOx in measurement-object gas is reduced in the periphery of a measurement electrode disposed in the measurement chamber. Then, feedback control is performed on a measurement pump cell so that a voltage V2 generated across the measurement electrode and a reference electrode reaches a predetermined target value, and the oxygen around the measurement electrode is pumped out. The concentration of NOx in the measurement-object gas is detected based on pump current Ip2 which flows then.

A gas sensor is also known, which detects water in the measurement-object gas. For example, the gas sensor described in PTL 2 detects a first current that flows between a pair of second electrodes with a first voltage generated across a pair of first electrodes, the first voltage being set in a range where the water in the measurement-object gas essentially is not dissociated. In addition, the gas sensor detects a second current that flows between the pair of second electrodes with a second voltage generated across the pair of first electrodes, the second voltage being set in a range where the water in the measurement-object gas is dissociated. The gas sensor then detects the humidity of the measurement-object gas based on the first current and the second current. The gas sensor described in PTL 3 adjusts the oxygen partial pressure in a first internal cavity of a sensor element so that all of the water vapor component and the carbon dioxide component in the measurement-object gas are substantially decomposed in the first internal cavity. The gas sensor then supplies oxygen to a second internal cavity by a first measurement electrochemical pumping cell so that the hydrogen generated by decomposition of the water vapor component is selectively burned in the second internal cavity, and identifies the concentration of the water vapor component present in the measurement-object gas based on the magnitude of a current flowing then. In addition, the gas sensor supplies oxygen to the surface of a second measurement inner electrode by a second measurement electrochemical pumping cell so that the carbon monoxide generated by decomposition of the carbon dioxide component is selectively burned, and identifies the concentration of the carbon dioxide component present in the measurement-object gas based on the magnitude of a current flowing then.

CITATION LIST

Patent Literature

PTL 1: Japanese Unexamined Patent Application Publication No. 2022-091669
PTL 2: Japanese Patent No. 5021697
PTL 3: Japanese Patent No. 5918177

SUMMARY OF THE INVENTION

Meanwhile, also in the gas sensor described in PTL 1, there has been a demand that not only a specific gas concentration but also a water concentration is desired to be detected. However, the sensor element of the gas sensor of PTL 2 does not include the oxygen concentration adjustment chamber and the measurement chamber described in PTL 1, and the structure of the sensor element is different between PTL 1 and PTL 2. The gas sensor of PTL 3 detects the concentration of water vapor component and the concentration of carbon dioxide component based on the current when oxygen is pumped into the inside of the sensor element, and PTL 3 does not include the description of PTL 1 stating that a specific gas concentration is detected based on the current when oxygen in the measurement chamber is pumped out, thus the method of detection of a specific gas concentration is different between PTL 1 and PTL 3. Thus, in a gas sensor including an oxygen concentration adjustment chamber and a measurement chamber as in PTL 1 and being configured to detect a specific gas concentration based on the pump current when oxygen is pumped out from the measurement chamber, a method for further detecting the water concentration in the measurement-object gas has not been known.

The present invention has been devised to solve such a problem, and it is a main object to detect the specific gas concentration and the water concentration in the measurement-object gas.

The present invention employs the following device to achieve the above-described main object.

[1] A gas sensor of the present invention is a sensor comprising: a sensor element including an element body including an oxygen-ion-conductive solid electrolyte layer and internally provided with a measurement-object gas flow portion that receives a measurement-object gas and causes the measurement-object gas to flow therethrough, a measurement pump cell constituted by including an inner measurement electrode disposed in a measurement chamber of the measurement-object gas flow portion, the measurement pump cell being configured to pump out oxygen in the measurement chamber to an outside of the element body, an adjustment pump cell constituted by including an inner adjustment electrode disposed in an oxygen concentration adjustment chamber located upstream of the measurement chamber of the measurement-object gas flow portion, the adjustment pump cell being configured to adjust an oxygen concentration in the oxygen concentration adjustment chamber, and a reference electrode disposed inside the element body to come into contact with a reference gas which serves as a reference for detection of a specific gas concentration that is a concentration of a specific gas in the measurement-object gas; and a control apparatus that performs an adjustment pump control process of adjusting the oxygen concentration in the oxygen concentration adjustment chamber by controlling the adjustment pump cell so that an adjustment voltage that is a voltage across the reference electrode and the inner adjustment electrode reaches an adjustment voltage target value, and a measurement pump control process of pumping out oxygen in the measurement chamber by controlling the measurement pump cell so that a measurement voltage that is a voltage across the reference electrode and the inner measurement electrode reaches a measurement voltage target value. The control apparatus detects the specific gas concentration in the measurement-object gas based on a measurement pump current which is caused to flow through the measurement pump cell by the measurement pump control process, and the control apparatus performs a water concentration detection process of detecting a water concentration in the measurement-object gas based on a change in the measurement pump current which flows during execution of the adjustment pump control process and the measurement pump control process when at least one of the adjustment voltage target value or the measurement voltage target value is changed.

In the gas sensor, the control apparatus performs the adjustment pump control process of adjusting the oxygen concentration in the oxygen concentration adjustment chamber by controlling the adjustment pump cell so that the adjustment voltage that is the voltage across the reference electrode and the inner adjustment electrode reaches the adjustment voltage target value. In addition, the control apparatus performs the measurement pump control process of pumping out the oxygen in the measurement chamber by controlling the measurement pump cell so that the measurement voltage that is the voltage across the reference electrode and the inner measurement electrode reaches the measurement voltage target value. The control apparatus then detects the specific gas concentration in the measurement-object gas based on the measurement pump current which is caused to flow through the measurement pump cell by the measurement pump control process. In addition, the control apparatus performs a water concentration detection process of detecting the water concentration in the measurement-object gas based on a change in the measurement pump current which flows during execution of the adjustment pump control process and the measurement pump control process when at least one of the adjustment voltage target value or the measurement voltage target value is changed. The inventors have found that the water concentration in the measurement-object gas correlates with the change in the measurement pump current when at least one of the adjustment voltage target value or the measurement voltage target value is changed. Thus, the water concentration in the measurement-object gas can be detected based on the change in the measurement pump current. Based upon the foregoing, the gas sensor of the present invention can detect the specific gas concentration and the water concentration in the measurement-object gas.

[2] In the above-described gas sensor (the gas sensor according to [1]), in the water concentration detection process, the control apparatus may change an absolute value of the adjustment voltage target value to a small value and changes an absolute value of the measurement voltage target value to a large value, or change the absolute value of the adjustment voltage target value to a large value and changes the absolute value of the measurement voltage target value to a small value. In this manner, even when the amount of change in each of the adjustment voltage target value and the measurement voltage target value is small, the change in the measurement pump current caused by the water in the measurement-object gas is relatively large, thus the water concentration is easily detected.

[3] In the above-described gas sensor (the gas sensor according to [1] or [2]), the oxygen concentration adjustment chamber may have a first internal cavity, and a second internal cavity provided downstream of the first internal cavity and upstream of the measurement chamber, the adjustment pump cell may have a main pump cell that adjusts an oxygen concentration in the first internal cavity, and an auxiliary pump cell that adjusts an oxygen concentration in the second internal cavity, the inner adjustment electrode may be an inner auxiliary pump electrode that is disposed in the second internal cavity and constitutes part of the auxiliary pump cell, and the adjustment pump control process may include a main pump control process of controlling the main pump cell to adjust the oxygen concentration in the first internal cavity, and an auxiliary pump control process of controlling the auxiliary pump cell so that the adjustment voltage reaches the adjustment voltage target value.

[4] In the above-described gas sensor (the gas sensor according to any one of [1] to [3]), the control apparatus may correct the specific gas concentration in the measurement-object gas based on the water concentration in the measurement-object gas, detected by the water concentration detection process. Even with the same specific gas concentration in the measurement-object gas, the measurement pump current may change according to the water concentration in the measurement-object gas. Thus, the accuracy of detection of the specific gas concentration is improved by correcting the specific gas concentration based on the detected water concentration.

[5] In the above-described gas sensor (the gas sensor according to any one of [1] to [4]), the control apparatus may perform a gas temperature detection process of detecting a gas temperature of the measurement-object gas based on a change in the measurement pump current which flows during execution of the adjustment pump control process and the measurement pump control process when the adjustment voltage target value is changed, and on a change in the measurement pump current which flows during execution of the adjustment pump control process and the measurement pump control process when the measurement voltage target value is changed. The inventors have found that upon comparison between the change in the measurement pump current when the adjustment voltage target value is changed and the change in the measurement pump current when the measurement voltage target value is changed, the former is unlikely to be affected by the gas temperature of the measurement-object gas. Thus, using this fact, the gas temperature of the measurement-object gas can be detected based on the former and the latter. In this case, in the water concentration detection process, the control apparatus preferably detects the water concentration in the measurement-object gas based on the change in the measurement pump current when the adjustment voltage target value is changed.

[6] In the above-described gas sensor (the gas sensor according to any one of [5]), the control apparatus may correct the specific gas concentration in the measurement-object gas based on the water concentration detected by the water concentration detection process and the gas temperature detected by the gas temperature detection process. Even with the same specific gas concentration in the measurement-object gas, the measurement pump current may change according to the water concentration and the gas temperature of the measurement-object gas. Thus, the accuracy of detection of the specific gas concentration is improved by correcting, based on a detected water concentration and a detected gas temperature, the specific gas concentration based on the measurement pump current.

DETAILED DESCRIPTION OF THE INVENTION

Figure 1:
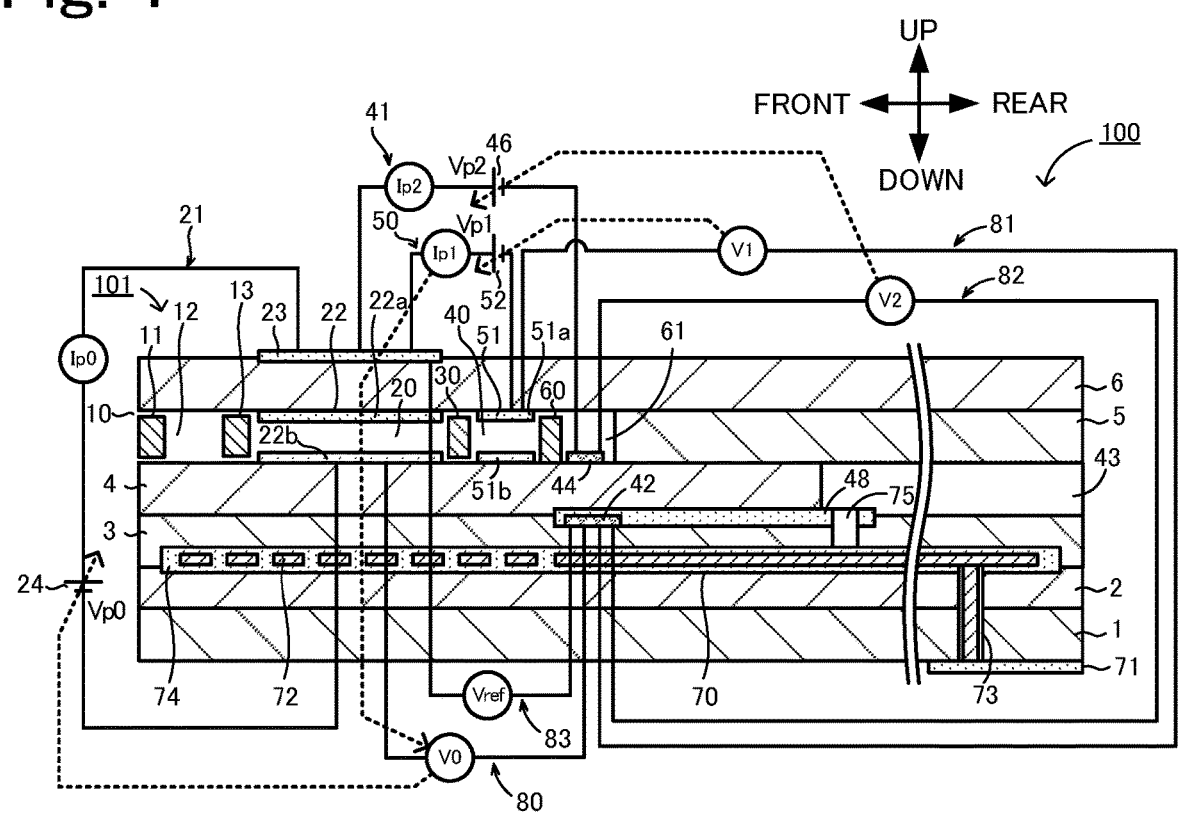
FIG. 1 is a cross-sectional schematic view schematically showing an example of the configuration of a gas sensor 100.
Figure 2:
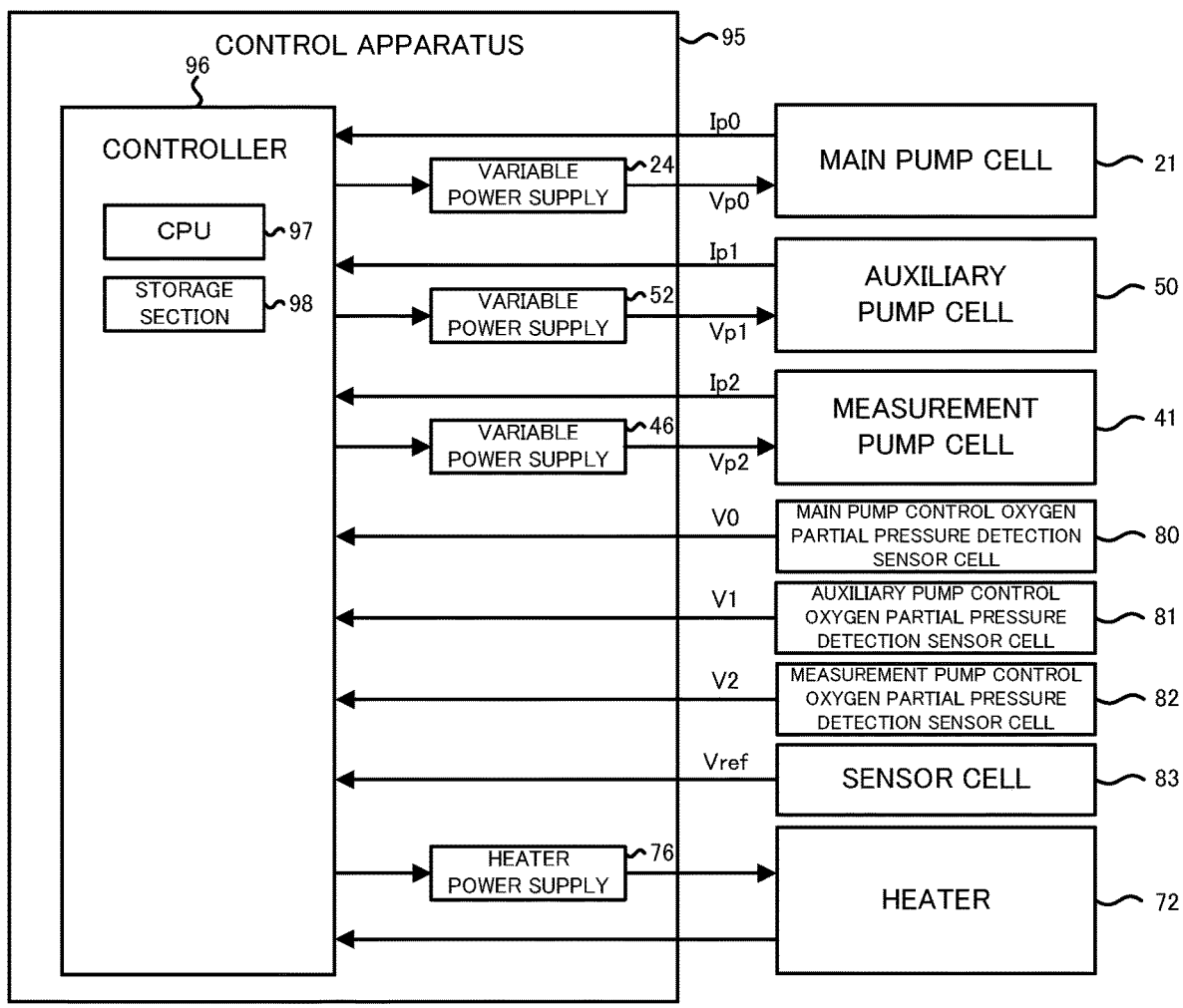
FIG. 2 is a block diagram showing an electrical connection relationship between a control apparatus 95, cells and a heater 72.

Next, an embodiment of the present invention will be described using the drawings. FIG. 1 is a cross-sectional schematic view schematically showing an example of the configuration of gas sensor 100 which is an embodiment of the present invention. FIG. 2 is a block diagram showing an electrical connection relationship between a control apparatus 95, cells and a heater 72. The gas sensor 100 is installed in a pipe, such as an exhaust gas pipe of an internal combustion engine, for example. The gas sensor 100 uses the exhaust gas from an internal combustion engine as the measurement-object gas, and detects the concentration of a specific gas, such as NOx and ammonia in the measurement-object gas. In this embodiment, the gas sensor 100 measures the NOx concentration as the specific gas concentration. The gas sensor 100 has a long rectangular parallelepiped sensor element 101, cells 21, 41, 50, 80 to 83 included in the sensor element 101, a heater portion 70 provided inside the sensor element 101, and a control apparatus 95 that includes variable power supplies 24, 46, 52 and a heater power supply 76, and controls the entire gas sensor 100.

The sensor element 101 is an element having a layered body in which six layers, that is, a first substrate layer 1, a second substrate layer 2, a third substrate layer 3, a first solid electrolyte layer 4, a spacer layer 5, and a second solid electrolyte layer 6, each made up of an oxygen-ion-conductive solid electrolyte layer made of zirconia ($ZrO_2$) or the like, are laminated in this order from a lower side in the drawing. The solid electrolyte forming these six layers is a dense, airtight one. The sensor element 101 is manufactured by, for example, applying predetermined processing, printing of a circuit pattern, and the like on a ceramic green sheet corresponding to each layer, then laminating those sheets, and further firing the sheets to be integrated.

At a tip end portion side of the sensor element 101 (left end portion side in FIG. 1), a gas inlet port 10, a first diffusion controlled portion 11, a buffer space 12, a second diffusion controlled portion 13, a first internal cavity 20, a third diffusion controlled portion 30, a second internal cavity 40, a fourth diffusion controlled portion 60, and a third internal cavity 61 are formed adjacent to each other so as to communicate with each other in this order between the under surface of the second solid electrolyte layer 6 and the top surface of the first solid electrolyte layer 4.

The gas inlet port 10, the buffer space 12, the first internal cavity 20, the second internal cavity 40, and the third internal cavity 61 are spaces of which top parts, bottom parts, and side parts, provided by hollowing the spacer layer 5, are respectively defined by the under surface of the second solid electrolyte layer 6, the top surface of the first solid electrolyte layer 4, and the side surface of the spacer layer 5 inside the sensor element 101.

Each of the first diffusion controlled portion 11, the second diffusion controlled portion 13, and the third diffusion controlled portion 30 is provided as two laterally long slits (openings of which the longitudinal direction is a direction perpendicular to the drawing). The fourth diffusion controlled portion 60 is provided as a single laterally long slit (an opening of which the longitudinal direction is a direction perpendicular to the drawing) formed as a clearance from the under surface of the second solid electrolyte layer 6. A part from the gas inlet port 10 to the third internal cavity 61 is also referred to as measurement-object gas flow portion.

At a location farther from the tip end side than the measurement-object gas flow portion, a reference gas inlet space 43 is provided between the top surface of the third substrate layer 3 and the under surface of the spacer layer 5 at a location at which the side part is defined by the side surface of the first solid electrolyte layer 4. For example, the atmosphere is introduced into the reference gas inlet space 43 as a reference gas at the time of measuring a NOx concentration.

A reference gas inlet layer 48 is a layer made of porous ceramics. The reference gas is introduced into the reference gas inlet layer 48 through the reference gas inlet space 43. The reference gas inlet layer 48 is formed so as to coat the reference electrode 42.

The reference electrode 42 is an electrode formed in such a manner in which the reference electrode 42 is sandwiched by the top surface of the third substrate layer 3 and the first solid electrolyte layer 4. As described above, the reference gas inlet layer 48 that communicates with the reference gas inlet space 43 is provided around the reference electrode 42. As will be described later, it is possible to measure an oxygen concentration (oxygen partial pressure) in the first internal cavity 20, an oxygen concentration (oxygen partial pressure) in the second internal cavity 40, and an oxygen concentration (oxygen partial pressure) in the third internal cavity 61 by using the reference electrode 42. The reference electrode 42 is formed as a porous cermet electrode (for example, a cermet electrode of Pt and $ZrO_2$).

In the measurement-object gas flow portion, the gas inlet port 10 is a portion that is open to an external space, and a measurement-object gas is taken into the sensor element 101 from the external space through the gas inlet port 10. The first diffusion controlled portion 11 is a portion that applies predetermined diffusion resistance to a measurement-object gas taken in through the gas inlet port 10. The buffer space 12 is a space provided to guide the measurement-object gas introduced from the first diffusion controlled portion 11 to the second diffusion controlled portion 13. The second diffusion controlled portion 13 is a portion that applies predetermined diffusion resistance to the measurement-object gas introduced from the buffer space 12 into the first internal cavity 20. When the measurement-object gas is introduced from the outside of the sensor element 101 into the first internal cavity 20, the measurement-object gas rapidly taken into the sensor element 101 through the gas inlet port 10 due to pressure fluctuations of the measurement-object gas in the external space (due to pulsation of exhaust pressure when the measurement-object gas is the exhaust gas of an automobile) is not directly introduced into the first internal cavity 20 but, after pressure fluctuations of the measurement-object gas are cancelled out through the first diffusion controlled portion 11, the buffer space 12, and the second diffusion controlled portion 13, the measurement-object gas is introduced into the first internal cavity 20. With this configuration, pressure fluctuations of the measurement-object gas introduced into the first internal cavity 20 are almost ignorable. The first internal cavity 20 is provided as a space used to adjust an oxygen partial pressure in the measurement-object gas introduced through the second diffusion controlled portion 13. The oxygen partial pressure is adjusted by the operation of a main pump cell 21.

The main pump cell 21 is an electrochemical pump cell made up of an inner pump electrode 22 having a ceiling electrode portion 22a provided almost all over the under surface of the second solid electrolyte layer 6, facing the first internal cavity 20, the outer pump electrode 23 provided so as to be exposed to the external space in a region of the top surface of the second solid electrolyte layer 6, corresponding to the ceiling electrode portion 22a, and the second solid electrolyte layer 6 sandwiched by these electrodes.

The inner pump electrode 22 is formed over the upper and lower solid electrolyte layers (the second solid electrolyte layer 6 and the first solid electrolyte layer 4) defining the first internal cavity 20, and the spacer layer 5 providing a side wall. Specifically, the ceiling electrode portion 22a is formed on the under surface of the second solid electrolyte layer 6, providing a ceiling surface of the first internal cavity 20, a bottom electrode portion 22b is formed on the top surface of the first solid electrolyte layer 4, providing a bottom surface, a side electrode portion (not shown) is formed on the side wall surface (inner surface) of the spacer layer 5, making both side wall portions of the first internal cavity 20, so as to connect those ceiling electrode portion 22a and the bottom electrode portion 22b, and the inner pump electrode 22 is disposed with a structure in a tunnel form at a portion where the side electrode portion is disposed.

The inner pump electrode 22 and the outer pump electrode 23 each are formed as a porous cermet electrode (for example, a cermet electrode of Pt and $ZrO_2$, having an Au content of 1 percent). The inner pump electrode 22 that contacts with a measurement-object gas is formed by using a material of which the reduction ability for NOx components in the measurement-object gas is lowered.

By passing a pump current Ip0 in a positive direction or a negative direction between the inner pump electrode 22 and the outer pump electrode 23 by applying a desired pump voltage Vp0 between the inner pump electrode 22 and the outer pump electrode 23, the main pump cell 21 is capable of pumping out oxygen in the first internal cavity 20 to the external space or pumping oxygen in the external space into the first internal cavity 20.

In order to detect an oxygen concentration (oxygen partial pressure) in an atmosphere in the first internal cavity 20, an electrochemical sensor cell, that is, a main pump control oxygen partial pressure detection sensor cell 80, is made up of the inner pump electrode 22, the second solid electrolyte layer 6, the spacer layer 5, the first solid electrolyte layer 4, the third substrate layer 3, and the reference electrode 42.

An oxygen concentration (oxygen partial pressure) in the first internal cavity 20 is found by measuring an electromotive force (voltage V0) in the main pump control oxygen partial pressure detection sensor cell 80. In addition, the pump current Ip0 is controlled by executing feedback control over the pump voltage Vp0 of a variable power supply 24 such that the voltage V0 becomes a target value. With this configuration, it is possible to maintain the oxygen concentration in the first internal cavity 20 at a predetermined constant value.

The third diffusion controlled portion 30 is a portion that applies predetermined diffusion resistance to a measurement-object gas of which the oxygen concentration (oxygen partial pressure) is controlled by operation of the main pump cell 21 in the first internal cavity 20 to guide the measurement-object gas to the second internal cavity 40.

The second internal cavity 40 is provided as a space used to further adjust the oxygen partial pressure by using an auxiliary pump cell 50 for the measurement-object gas adjusted in the oxygen concentration (oxygen partial pressure) in the first internal cavity 20 in advance and then introduced through the third diffusion controlled portion 30. With this configuration, it is possible to highly accurately maintain the oxygen concentration in the second internal cavity 40 at a constant value, so it is possible to measure a highly accurate NOx concentration with the gas sensor 100.

The auxiliary pump cell 50 is an auxiliary electrochemical pump cell made up of an auxiliary pump electrode 51 having a ceiling electrode portion 51a provided substantially all over the under surface of the second solid electrolyte layer 6, facing the second internal cavity 40, the outer pump electrode 23 (not limited to the outer pump electrode 23, and an adequate electrode outside the sensor element 101 may be used), and the second solid electrolyte layer 6.

The auxiliary pump electrode 51 is disposed in the second internal cavity 40 with a structure in a similar tunnel form to that of the inner pump electrode 22 provided in the above-described first internal cavity 20. In other words, the auxiliary pump electrode 51 has such a structure in a tunnel form that a ceiling electrode portion 51a is formed on the second solid electrolyte layer 6 providing the ceiling surface of the second internal cavity 40, a bottom electrode portion 51b is formed on the first solid electrolyte layer 4 providing the bottom surface of the second internal cavity 40, a side electrode portion (not shown) that couples those ceiling electrode portion 51a and bottom electrode portion 51b is formed on each of both wall surfaces of the spacer layer 5, providing a side wall of the second internal cavity 40. The auxiliary pump electrode 51, as well as the inner pump electrode 22, is formed by using a material of which the reduction ability for NOx components in the measurement-object gas is lowered.

By applying a desired voltage Vp1 between the auxiliary pump electrode 51 and the outer pump electrode 23, the auxiliary pump cell 50 is capable of pumping out oxygen in an atmosphere in the second internal cavity 40 to the external space or pumping oxygen from the external space into the second internal cavity 40.

In order to control an oxygen partial pressure in an atmosphere in the second internal cavity 40, an electrochemical sensor cell, that is, an auxiliary pump control oxygen partial pressure detection sensor cell 81, is made up of the auxiliary pump electrode 51, the reference electrode 42, the second solid electrolyte layer 6, the spacer layer 5, the first solid electrolyte layer 4, and the third substrate layer 3.

The auxiliary pump cell 50 performs pumping with a variable power supply 52 of which the voltage is controlled in accordance with an electromotive force (voltage V1) detected by the auxiliary pump control oxygen partial pressure detection sensor cell 81. With this configuration, the oxygen partial pressure in an atmosphere in the second internal cavity 40 is controlled to a low partial pressure that substantially does not influence measurement of NOx.

Together with this, its pump current Ip1 is used to control the electromotive force of the main pump control oxygen partial pressure detection sensor cell 80. Specifically, the pump current Ip1 is input to the main pump control oxygen partial pressure detection sensor cell 80 as a control signal, and the gradient of the oxygen partial pressure in the measurement-object gas to be introduced from the third diffusion controlled portion 30 into the second internal cavity 40 is controlled to be constantly unchanged by controlling the above-described target value of the voltage V0. When used as a NOx sensor, the oxygen concentration in the second internal cavity 40 is maintained at a constant value of about 0.001 ppm by the functions of the main pump cell 21 and auxiliary pump cell 50.

The fourth diffusion controlled portion 60 is a portion that applies predetermined diffusion resistance to measurement-object gas of which the oxygen concentration (oxygen partial pressure) is controlled by operation of the auxiliary pump cell 50 in the second internal cavity 40 to guide the measurement-object gas to the third internal cavity 61. The fourth diffusion controlled portion 60 plays a role in limiting the amount of NOx flowing into the third internal cavity 61.

The third internal cavity 61 is provided as a space used to perform a process related to measurement of a nitrogen oxide (NOx) concentration in a measurement-object gas on the measurement-object gas adjusted in oxygen concentration (oxygen partial pressure) in the second internal cavity 40 in advance and then introduced through the fourth diffusion controlled portion 60. Measurement of a NOx concentration is mainly performed by operation of a measurement pump cell 41 in the third internal cavity 61.

The measurement pump cell 41 measures a NOx concentration in the measurement-object gas in the third internal cavity 61. The measurement pump cell 41 is an electrochemical pump cell made up of a measurement electrode 44 provided on the top surface of the first solid electrolyte layer 4, facing the third internal cavity 61, the outer pump electrode 23, the second solid electrolyte layer 6, the spacer layer 5, and the first solid electrolyte layer 4. The measurement electrode 44 is a porous cermet electrode made of a material of which the reduction ability for NOx components in the measurement-object gas is raised as compared to the inner pump electrode 22. The measurement electrode 44 also functions as a NOx reduction catalyst that reduces NOx present in an atmosphere in the third internal cavity 61.

The measurement pump cell 41 is capable of pumping out oxygen produced as a result of decomposition of nitrogen oxides in an atmosphere around the measurement electrode 44 and detecting the amount of oxygen produced as a pump current Ip2.

In order to detect an oxygen partial pressure around the measurement electrode 44, an electrochemical sensor cell, that is, a measurement pump control oxygen partial pressure detection sensor cell 82, is made up of the first solid electrolyte layer 4, the third substrate layer 3, the measurement electrode 44, and the reference electrode 42. A variable power supply 46 is controlled in accordance with an electromotive force (voltage V2) detected by the measurement pump control oxygen partial pressure detection sensor cell 82.

A measurement-object gas guided into the second internal cavity 40 reaches the measurement electrode 44 in the third internal cavity 61 through the fourth diffusion controlled portion 60 in a situation in which the oxygen partial pressure is controlled. Nitrogen oxides in the measurement-object gas around the measurement electrode 44 are reduced ($2NO \rightarrow N_2 + O_2$) to produce oxygen. The produced oxygen is to be pumped by the measurement pump cell 41. At this time, the voltage Vp2 of the variable power supply 46 is controlled such that the voltage V2 detected by the measurement pump control oxygen partial pressure detection sensor cell 82 is constant (target value). The amount of oxygen produced around the measurement electrode 44 is proportional to the concentration of nitrogen oxides in the measurement-object gas, so a nitrogen oxide concentration in the measurement-object gas is calculated by using the pump current Ip2 in the measurement pump cell 41.

When an oxygen partial pressure detection device is constructed as an electrochemical sensor cell by combining the measurement electrode 44, the first solid electrolyte layer 4, the third substrate layer 3, and the reference electrode 42, an electromotive force according to the difference between the amount of oxygen produced by reduction of the NOx component in the atmosphere around the measurement electrode 44, and the amount of oxygen contained in the reference atmosphere can be detected, and accordingly, the concentration of the NOx component in the measurement-object gas can be determined.

An electrochemical sensor cell 83 is made up of the second solid electrolyte layer 6, the spacer layer 5, the first solid electrolyte layer 4, the third substrate layer 3, the outer pump electrode 23, and the reference electrode 42, and it is possible to detect an oxygen partial pressure in a measurement-object gas outside the sensor by using an electromotive force (voltage Vref) obtained by the sensor cell 83.

In the gas sensor 100 having such a configuration, a measurement-object gas of which the oxygen partial pressure is maintained at a constantly unchanged low value (a value that substantially does not influence measurement of NOx) is supplied to the measurement pump cell 41 by operating the main pump cell 21 and the auxiliary pump cell 50. Therefore, it is possible to find a NOx concentration in the measurement-object gas in accordance with a pump current Ip2 that flows as a result of pumping out oxygen, produced by reduction of NOx, by the measurement pump cell 41 substantially in proportion to a NOx concentration in the measurement-object gas.

In addition, the sensor element 101 includes the heater portion 70 that plays a role in temperature adjustment for maintaining the temperature of the sensor element 101 by heating in order to increase the oxygen ion conductivity of the solid electrolyte. The heater portion 70 includes a heater connector electrode 71, a heater 72, a through-hole 73, a heater insulating layer 74, and a pressure release hole 75.

The heater connector electrode 71 is an electrode formed in such a manner as to be in contact with the under surface of the first substrate layer 1. Connection of the heater connector electrode 71 to an external power supply allows electric power to be supplied from the outside to the heater portion 70.

The heater 72 is an electric resistor formed in such a manner as to be sandwiched by the second substrate layer 2 and the third substrate layer 3 from upper and lower sides. The heater 72 is connected to the heater connector electrode 71 via the through-hole 73, and is supplied with electric power from a heater power supply 76 (see FIG. 2) to generate heat to increase and retain the temperature of the solid electrolyte forming the sensor element 101.

The heater 72 is embedded all over the region from the first internal cavity 20 to the third internal cavity 61, and is capable of adjusting the overall sensor element 101 to a temperature at which the solid electrolyte is activated.

The heater insulating layer 74 is an electrically insulating layer formed of an insulating material, such as alumina, on the top and under surfaces of the heater 72. The heater insulating layer 74 is formed for the purpose of obtaining an electrical insulation property between the second substrate layer 2 and the heater 72 and an electrical insulation property between the third substrate layer 3 and the heater 72.

The pressure release hole 75 is a portion provided so as to extend through the third substrate layer 3 and the reference gas inlet layer 48 and communicate with the reference gas inlet space 43. The pressure release hole 75 is formed for the purpose of easing an increase in internal pressure resulting from an increase in temperature in the heater insulating layer 74.

As shown in FIG. 2, the control apparatus 95 includes the above-mentioned variable power supplies 24, 46, 52, the above-mentioned heater power supply 76, and a controller 96. The controller 96 is a microprocessor including a CPU 97, and a storage section 98. The storage section 98 is a non-volatile memory capable of rewriting information, and can store various programs and various data, for example. The controller 96 receives input of voltage V0 detected by the main pump control oxygen partial pressure detection sensor cell 80, voltage V1 detected by the auxiliary pump control oxygen partial pressure detection sensor cell 81, voltage V2 detected by the measurement pump control oxygen partial pressure detection sensor cell 82, voltage Vref detected by the sensor cell 83, pump current Ip0 detected by the main pump cell 21, pump current Ip1 detected by the auxiliary pump cell 50 and pump current Ip2 detected by the measurement pump cell 41. The controller 96 controls the voltages Vp0, Vp1, Vp2 output by the variable power supplies 24, 46, 52 by outputting a control signal to the variable power supplies 24, 46, 52, thereby controlling the main pump cell 21, the measurement pump cell 41 and the auxiliary pump cell 50. The controller 96 controls the electric power supplied to the heater 72 from the heater power supply 76 by outputting a control signal to the heater power supply 76. The storage section 98 also stores the later-described target values V0*, V1*, V2*, etc. The CPU 97 of the controller 96 controls the cells 21, 41, 50 by referring to these target values V0*, V1*, V2*.

The controller 96 executes an auxiliary pump control process of controlling the auxiliary pump cell 50 so that the oxygen concentration in the second internal cavity 40 reaches a target concentration. Specifically, the controller 96 controls the auxiliary pump cell 50 by executing feedback control on the voltage Vp1 of the variable power supply 52 so that the voltage V1 reaches a constant value (referred to as target value V1*). The target value V1* is defined as the value that causes the oxygen concentration in the second internal cavity 40 to reach a predetermined low oxygen concentration that does not substantially affect measurement of NOx.

The controller 96 executes a main pump control process of controlling the main pump cell 21 so that the pump current Ip1 flowing when the oxygen concentration in the second internal cavity 40 is adjusted by the auxiliary pump cell 50 in the auxiliary pump control process reaches a target current (referred to as target value Ip1*). Specifically, the controller 96 sets (feedback-controls) a target value (referred to as a target value V0*) of the voltage V0 based on the pump current Ip1 so that the pump current Ip1 caused to flow by the voltage Vp1 reaches the constant target current Ip1*. The controller 96 then performs feedback control on the pump voltage Vp0 of the variable power supply 24 so that the voltage V0 reaches the target value V0* (in other words, the oxygen concentration in the first internal cavity 20 reaches the target concentration). The gradient of oxygen partial pressure in the measurement-object gas to be introduced from the third diffusion controlled portion 30 into the second internal cavity 40 is made unchanged constantly by the main pump control process. The target value V0* is set to a value which causes the oxygen concentration in the first internal cavity 20 to be higher than 0% and reach a low oxygen concentration. The pump current Ip0 which flows during the main pump control process varies according to the oxygen concentration in the measurement-object gas (that is, the measurement-object gas in the vicinity of the sensor element 101) which flows into the measurement-object gas flow portion through the gas inlet port 10. Thus, the controller 96 can also detect the oxygen concentration in the measurement-object gas based on the pump current Ip0.

The main pump control process and the auxiliary pump control process described above are also collectively referred as an adjustment pump control process. The first internal cavity 20 and the second internal cavity 40 are also collectively referred as an oxygen concentration adjustment chamber. The main pump cell 21 and the auxiliary pump cell 50 are also collectively referred as an adjustment pump cell. The controller 96 executes the adjustment pump control process, thus the adjustment pump cell adjusts the oxygen concentration in the oxygen concentration adjustment chamber.

In addition, the controller 96 executes a measurement pump control process of controlling the measurement pump cell 41 so that the voltage V2 reaches a constant value (referred to as a target value V2*) (in other words, so that the oxygen concentration in the third internal cavity 61 reaches a predetermined low concentration). Specifically, the controller 96 controls the measurement pump cell 41 by performing feedback control on the voltage Vp2 of the variable power supply 46 so that the voltage V2 reaches the target value V2*. Oxygen is pumped out from the third internal cavity 61 by the measurement pump control process.

Execution of the measurement pump control process causes oxygen to be pumped out from the third internal cavity 61 so that the oxygen produced due to reduction of NOx in the measurement-object gas in the third internal cavity 61 become substantially zero. The controller 96 obtains a pump current Ip2 as a detected value corresponding to the oxygen produced in the third internal cavity 61 from a specific gas (herein, NOx), and calculates the NOx concentration in the measurement-object gas based on the pump current Ip2.

The storage section 98 stores a relational expression (for example, an expression of a linear function or a quadratic function) or a map as a correspondence relationship between the pump current Ip2 and the NOx concentration. Such a relational expression or map can be determined in advance by an experiment.

The controller 96 performs a heater control process of controlling the heater 72 by outputting a control signal to the heater power supply 76 so that the temperature of the heater 72 reaches a target temperature (for example, 800° C.) Here, the temperature of the heater 72 can be expressed as a linear function of the resistance value of the heater 72. Thus, in the heater control process, the controller 96 calculates the resistance value of the heater 72 as a value (a value convertible to the temperature) regarded as the temperature of the heater 72, and performs feedback control on the heater power supply 76 so that the calculated resistance value reaches a target resistance value (a resistance value corresponding to the target temperature). The controller 96 obtains, for example, the voltage of the heater 72 and the current flowing through the heater 72, and can calculate the resistance value of the heater 72 based on the obtained voltage and current. The controller 96 may calculate the resistance value of the heater 72, for example, by 3-terminal method or 4-terminal method. When passing an electric current through the heater 72, the heater power supply 76 adjusts the electric power supplied to the heater 72 by changing the value of the voltage to be applied to the heater 72 based on, for example, a control signal from the controller 96.

Figure 3:
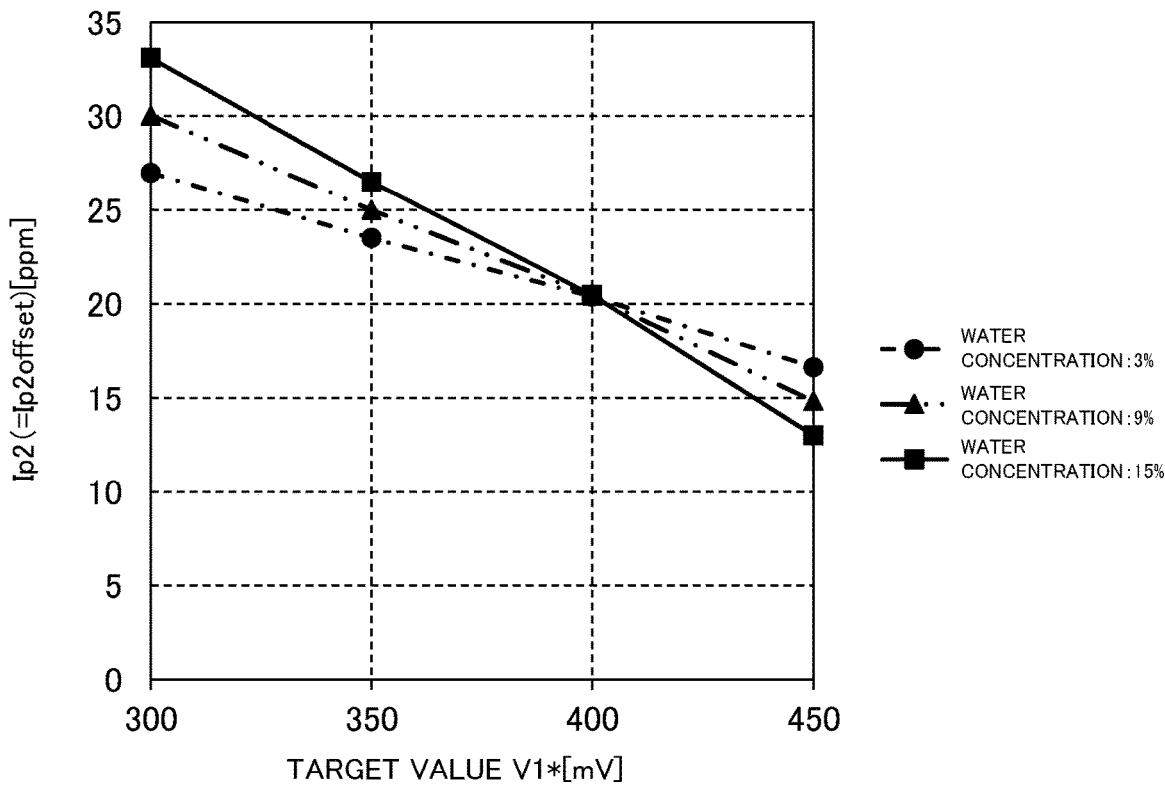
FIG. 3 is a graph showing a relationship between target value V1*, water concentration and pump current Ip2.

The inventors have studied the relationship between the target value V1* of the gas sensor 100, the water concentration in the measurement-object gas, and the pump current Ip2. First, as the measurement-object gas, three gas types were prepared: a first gas containing nitrogen as the base gas, an oxygen concentration of 0%, a water concentration of 3%, and an NO concentration of 0 ppm, a second gas having the same composition as that of the first gas except for a water concentration of 9%, and a third gas having the same composition as that of the first gas except for a water concentration of 15%. Next, the target value V2* was set to 400 mV, the target value V1* was set to 300 mV, and the pump current Ip2 was measured when the controller 96 performed the above-described adjustment pump control process and measurement pump control process on the first gas. The controller 96 started the above-described heater control process, then after the temperature of the heater 72 reached near the target temperature, started the adjustment pump control process and the measurement pump control process, and subsequently measured the value of the pump current Ip2 with the pump current Ip2 stable. Furthermore, the controller 96 measured the pump current Ip2 corresponding to the value of each target value V1* in the same manner as described above except that the target value V1* is changed to 350 mV, 400 mV, 450 mV. For the second gas and the third gas, the controller 96 measured the pump current Ip2 corresponding to the value of each target value V1* in the same manner as described above. The result is shown in FIG. 3. FIG. 3 is a graph showing a relationship between target value V1*, water concentration in the measurement-object gas, and pump current Ip2. The pump current Ip2 in the vertical axis of FIG. 3 is shown as a value (unit is ppm) obtained by converting the pump current Ip2 to an NO concentration using a correspondence relationship between the pump current Ip2 and the NOx concentration stored in the storage section 98. Since each of the first to third gases has an NO concentration of 0 ppm, the pump current Ip2 is theoretically 0 µA in each case, but actually, a slight pump current Ip2 flows. Such a pump current Ip2 which is caused to flow due to a factor other than the specific gas (NOx in this case) is referred to as an offset current Ip2offset. Thus, FIG. 3 shows a relationship between the target value V1*, the water concentration in the measurement-object gas, and the offset current Ip2offset. The offset current Ip2offset is also contained in the pump current Ip2 when the NOx concentration is not 0 ppm.

Figure 4:
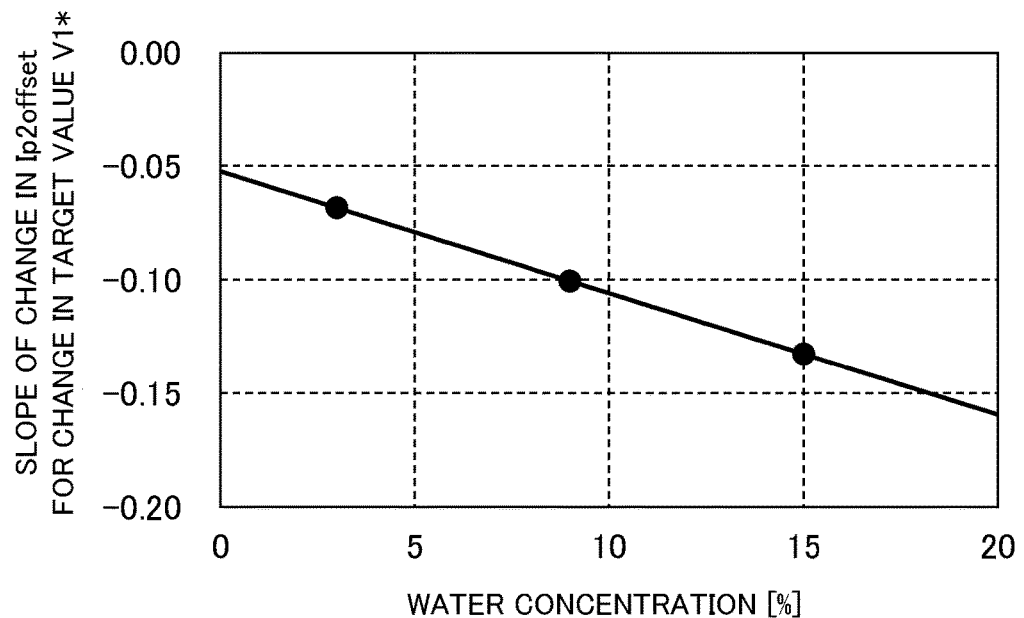
FIG. 4 is a graph showing a relationship between water concentration and slope of change in offset current Ip2offset for change in target value V1*.

As shown in FIG. 3, there is a linear correlation between the target value V1* and the offset current Ip2offset, and it has been identified that the offset current Ip2offset tends to decrease for higher target value V1*. Also, regarding the slope of the change in the offset current Ip2offset for the change in the target value V1*, it has been identified that the absolute value of the slope tends to increase for higher water concentration in the measurement-object gas. FIG. 4 is a graph showing a relationship between the water concentration in the measurement-object gas and the slope of the change in the offset current Ip2offset for the change in the target value V1*, the relationship being calculated from the data shown in FIG. 3. As shown in FIG. 4, there is a linear correlation between the water concentration and the slope of the offset current Ip2offset, and it has been identified that the slope of the offset current Ip2offset tends to decrease (the absolute value of negative slope tends to increase) for higher water concentration. From these results, it is found that the water concentration in the measurement-object gas can be detected based on the change (for example, the slope of the change in the offset current Ip2offset when the target value V1* is changed) in the pump current Ip2 when the target value V1* is changed. This is new knowledge obtained by the inventors this time.

Figure 5:
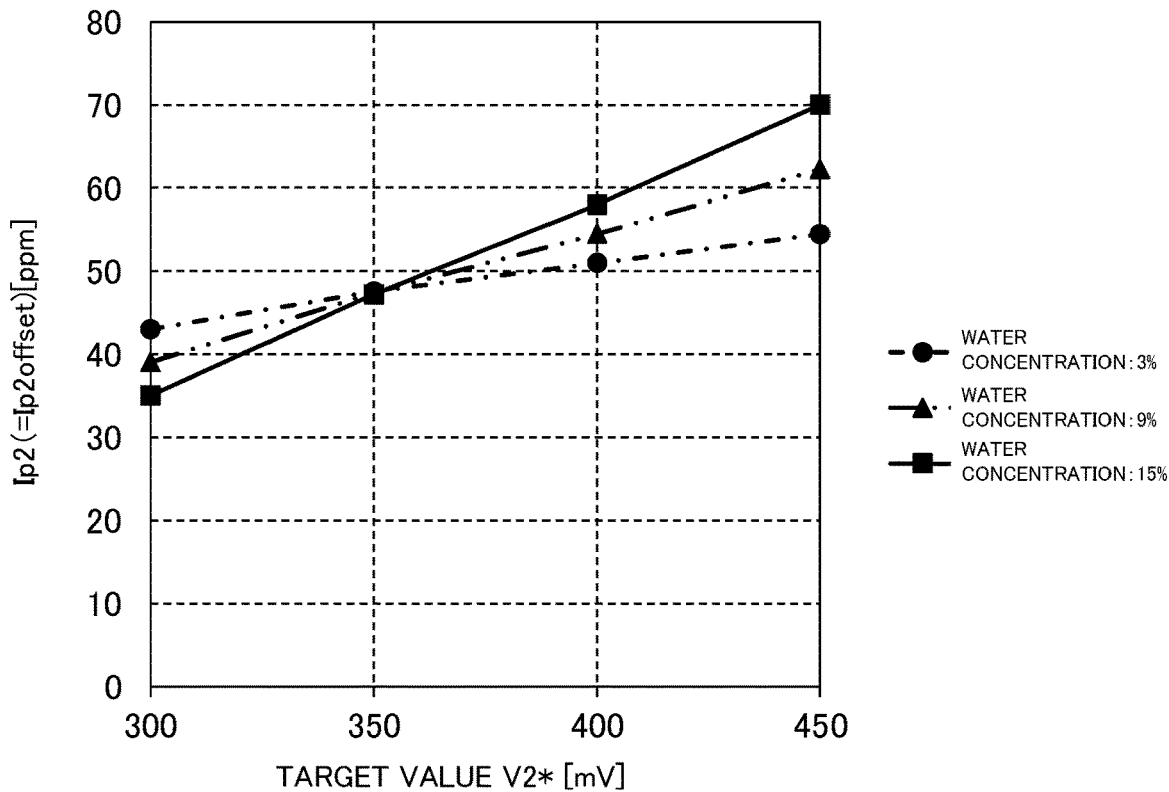
FIG. 5 is a graph showing a relationship between target value V2*, water concentration and pump current Ip2.
Figure 6:
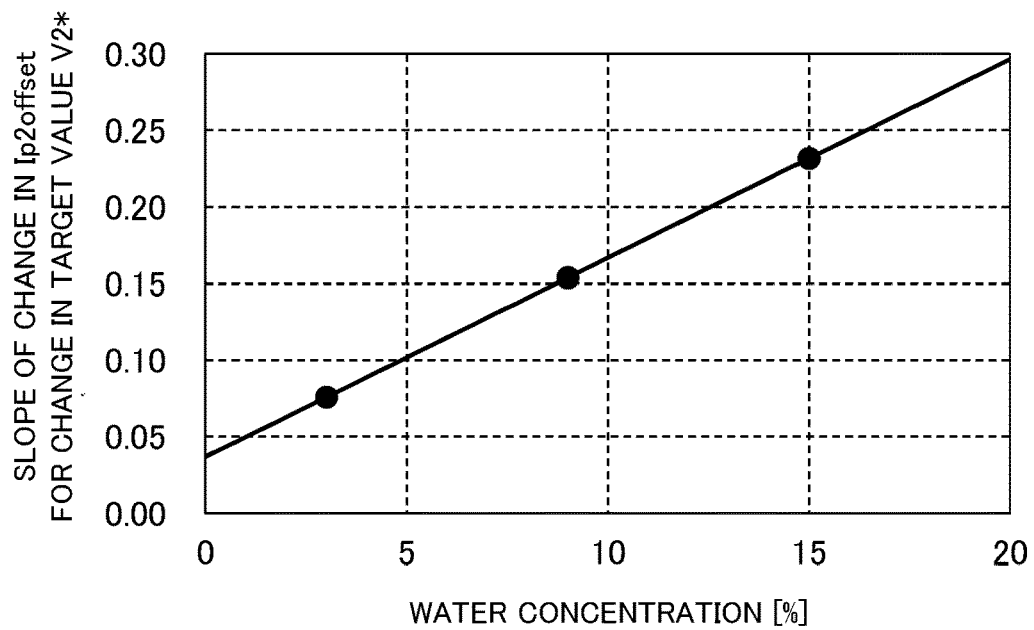
FIG. 6 is a graph showing a relationship between water concentration and slope of change in offset current Ip2offset for change in target value V2*.

As in FIG. 3, the inventors have studied the relationship between the target value V2* of the gas sensor 100, the water concentration in the measurement-object gas, and the pump current Ip2. Specifically, with the target value V1* set to 385 mV, and the target value V2* changed in four ways: 300 mV, 350 mV, 400 mV, 450 mV, using the same first to third gases as mentioned above, a pump current Ip2 corresponding to the value of each target value V2* was measured in the same manner as in the measurement of data in FIG. 3. The result is shown in FIG. 5. FIG. 5 is a graph showing a relationship between the target value V2*, the water concentration in the measurement-object gas and the pump current Ip2. FIG. 6 is a graph showing a relationship between the water concentration in the measurement-object gas and the slope of the change in the offset current Ip2offset for the change in the target value V2*, the relationship being calculated from the data shown in FIG. 5. As shown in FIG. 5, there is a linear correlation between the target value V2* and the offset current Ip2offset, and it has been identified that the offset current Ip2offset tends to increase for higher target value V2*. Also, regarding the slope of the change in the offset current Ip2offset for the change in the target value V2*, it has been identified that the absolute value of the slope tends to increase for higher water concentration in the measurement-object gas. As shown in FIG. 6, there is a linear correlation between the water concentration and the slope of the offset current Ip2offset, and it has been identified that the slope of the offset current Ip2offset tends to increase (the absolute value of positive slope tends to increase) for higher water concentration. From these results, it is found that the water concentration in the measurement-object gas can be detected based on the change (for example, the slope of the change in the offset current Ip2offset when the target value V2* is changed) in the pump current Ip2 when the target value V2* is changed. This is new knowledge obtained by the inventors this time.

Based upon the foregoing, when at least one of the target value V1* or the target value V2* is changed, change in the pump current Ip2 which flows during execution of the adjustment pump control process and the measurement pump control process correlates with the water concentration in the measurement-object gas, thus it is found that the water concentration can be detected based on the change in the pump current Ip2. In this embodiment, as a relationship between the slope of the change in the pump current Ip2 and the water concentration in the measurement-object gas when the target value V1* is changed, a linear function or a map representing the linear relationship shown in FIG. 4 is stored in the storage section 98.

Note that the reason why the relationship shown in FIG. 3 to FIG. 6 holds between the target value V1* and the target value V2*, the water concentration in the measurement-object gas, and the pump current Ip2 (particularly, the offset current Ip2offset) is as follows.

First, the relationship between the water in the measurement-object gas and the offset current Ip2offset will be described. When the adjustment pump control process (herein, the main pump control process and the auxiliary pump control process) is performed with water present in the measurement-object gas, at least part of the water around the auxiliary pump electrode 51 is decomposed by the voltage Vp1 of the variable power supply 52, and hydrogen ($H_2$) and oxygen ($O_2$) are produced. The produced oxygen is pumped out from the periphery of the auxiliary pump electrode 51, that is, from the second internal cavity 40 by the auxiliary pump cell 50, and at least part of the produced hydrogen reaches the third internal cavity 61. The hydrogen which has reached the third internal cavity 61 reacts with the oxygen in the third internal cavity 61 to produce water, thus a decrease occurs in the amount of oxygen pumped out from the third internal cavity 61 by the measurement pump control process, in other words, the pump current Ip2 decreases. In contrast, when the measurement pump control process is performed with water present in the measurement-object gas, at least part of the water around the measurement electrode 44 in the third internal cavity 61 is decomposed by the voltage Vp2 of the variable power supply 46, and hydrogen ($H_2$) and oxygen (02) are produced. Thus, an increase occurs in the amount of oxygen pumped out from the third internal cavity 61 by the measurement pump control process, in other words, the pump current Ip2 increases. In this manner, the pump current Ip2 decreases due to the hydrogen produced from the water around the auxiliary pump electrode 51, and the pump current Ip2 increases due to the oxygen produced from water around the measurement electrode 44, thus the sum of the amount of decrease and the amount of increase in the pump current Ip2 not from NOx in the measurement-object gas is observed as the offset current Ip2offset.

For higher target value V1*, in other words, for lower target value of the oxygen concentration in the second internal cavity 40, the voltage Vp1 is more likely to have a high value due to the auxiliary pump control process, thus an increase occurs in the amount of hydrogen produced from decomposition of water around the auxiliary pump electrode 51 by the voltage Vp1, and the amount of decrease in the pump current Ip2 also increases. In addition, for higher water concentration in the measurement-object gas, an increase occurs in the amount of hydrogen produced from decomposition of water around the auxiliary pump electrode 51, thus the amount of decrease in the pump current Ip2 according to the amount of change in the target value V1*, in other words, the slope of the change in the pump current Ip2 for the change in the target value V1* becomes steeper. In other words, the absolute value of the slope increases. For these reasons, the relationship shown in FIG. 3 and FIG. 4 is probably exhibited.

Similarly, for higher target value V2*, in other words, for lower target value of the oxygen concentration in the third internal cavity 61, the voltage Vp2 is more likely to have a high value due to the measurement pump control process, thus an increase occurs in the amount of oxygen produced from decomposition of water due to the voltage Vp2 around the measurement electrode 44, and the amount of increase in the pump current Ip2 also increases. In addition, for higher water concentration in the measurement-object gas, an increase occurs in the amount of oxygen produced from decomposition of water around the measurement electrode 44, thus the amount of increase in the pump current Ip2 according to the amount of change in the target value V2*, in other words, the slope of the change in the pump current Ip2 for the change in the target value V2* becomes steeper. In other words, the absolute value of the slope increases. For these reasons, the relationship shown in FIG. 5 and FIG. 6 is probably exhibited.

Figure 7:
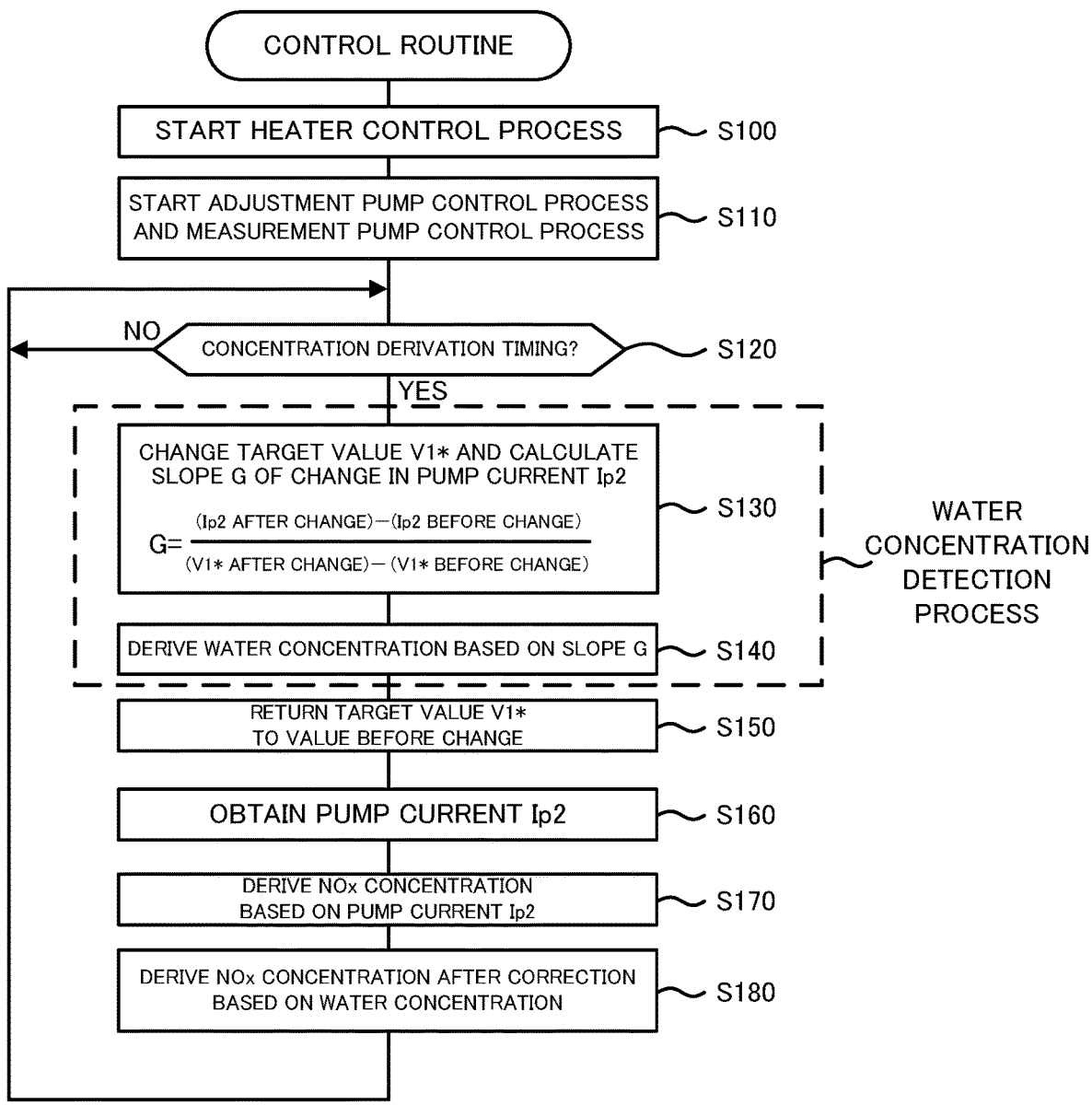
FIG. 7 is a flowchart showing an example of a control routine.

Next, an example of the process of making measurement of water concentration and measurement of NOx concentration by the controller 96 of the gas sensor 100 will be described. FIG. 7 is a flowchart showing an example of a control routine performed by the controller 96. The controller 96 stores the routine, for example, in the storage section 98. Upon input of a start command, for example, from an engine ECU which is not shown, the controller 96 starts the control routine.

Upon start of the control routine, the CPU 97 of the controller 96 first starts the above-described heater control process (step S100). Subsequently, the CPU 97 starts the above-described adjustment pump control process and measurement pump control process (step S110). At this point, as the values used for measurement of NOx concentration, the values pre-stored in the storage section 98 are used as the target value V1* and the target value V2*. Next, the CPU97 determines whether or not a concentration derivation timing for deriving the water concentration and NOx concentration has been reached (step S120). For example, at every elapse of a predetermined time or when a concentration derivation command is input from the engine ECU, the CPU 97 determines that a concentration derivation timing has been reached.

When it is determined in step S120 that a concentration derivation timing has been reached, the CPU 97 first performs a water concentration detection process of detecting the water concentration in the measurement-object gas based on the change in the pump current Ip2 which flows during execution of the adjustment pump control process and the measurement pump control process when at least one of the target value V1* or the target value V2* is changed (steps S130, S140). In this embodiment, in the water concentration detection process, the CPU 97 changes the target value V1*, and does not change the target value V2*. In the water concentration detection process, the CPU 97 first calculates the slope G of the change in the pump current Ip2 when the target value V1* is changed (step S130). Specifically, the CPU 97 first measures the current pump current Ip2, and obtains it as the value of the pump current Ip2 in a state before the target value V1* is changed. Next, the CPU 97 changes the target value V1*, waits until the value of the pump current Ip2 becomes stable, measures the pump current Ip2 after becoming stable, and obtains it as the value of the pump current Ip2 in a state after the change. The slope G is derived by dividing the difference between the values of the pump current Ip2 before and after the change by the difference between the values of the target value V1* before and after the change. Note that the length of time since the target value V1* is changed until the pump current Ip2 becomes stable is an extremely short time (from several msec to several tens of msec), and normally, almost no change occurs during this time in the NOx concentration in the exhaust gas of an internal combustion engine. Thus, the difference between the values of the pump current Ip2 before and after the change in the target value V1* can be regarded as the amount of change in the offset current Ip2offset before and after the change in the target value V1*. Therefore, the slope G derived in step S130 corresponds to the slope of the straight line shown in FIG. 3 and the value of the vertical axis in FIG. 4. The CPU97 then calculates the water concentration in the measurement-object gas based on the derived slope G and the correspondence relationship (the above-mentioned correspondence relationship between the slope of the change in the pump current Ip2 and the water concentration in the measurement-object gas when the target value V1* is changed) stored in the storage section 98 (step S140). The CPU 97 outputs the value of the derived water concentration to the engine ECU, or stores the value in the storage section 98. In step S130, the target value V1* may be changed so that the absolute value thereof is increased, or so that the absolute value is decreased. However, each of the values before and after the change is preferably less than or equal to the absolute value of the target value V1* defined for measurement of the NOx concentration. For example, when the target value V1* before the change is the same as the target value V1* defined for measurement of the NOx concentration, it is preferable that the target value V1* be changed so that the absolute value thereof is decreased. In this manner, decomposition of NOx due to too high voltage Vp1 around the auxiliary pump electrode 51 can be prevented, thus reduction in the accuracy of measurement of the NOx concentration can be prevented.

When deriving the water concentration in step S140, the CPU 97 returns the target value V1* to the value before the change. Specifically, the CPU 97 returns the target value V1* to the value defined for measurement of the NOx concentration (step S150). Subsequently, the CPU 97 obtains the pump current Ip2 which is caused to flow by the measurement pump control process (step S160), and derives the NOx concentration in the measurement-object gas based on the obtained pump current Ip2 and the correspondence relationship (the above-mentioned correspondence relationship between the pump current Ip2 and the NOx concentration) stored in the storage section 98 (step S170). The CPU 97 then corrects the NOx concentration derived in step S170 based on the water concentration derived in step S140, and derives the NOx concentration after the correction (step S180). The CPU 97 outputs the derived value of NOx concentration after the correction to the engine ECU, and stores the derived value in the storage section 98. As shown in FIG. 3, the offset current Ip2offset of the pump current Ip2 changes due to the water concentration in the measurement-object gas. Thus, even with the same NOx concentration in the measurement-object gas, the pump current Ip2 may be changed according to the water concentration in the measurement-object gas, and an error may occur in the derived NOx concentration. Thus, in this embodiment, the CPU 97 corrects the NOx concentration according to the pump current Ip2 based on the detected water concentration. For example, when the target value V1* is 350 mV in FIG. 3, the offset current Ip2offset for the water concentration of 15% is greater than the offset current Ip2offset for the water concentration of 3% by 3 ppm in NOx concentration conversion. Thus, for example, when the correspondence relationship between the pump current Ip2 and the NOx concentration, stored in the storage section 98 is calculated using the measurement-object gas with a water concentration of 3%, the derived NOx concentration with an actual water concentration in the measurement-object gas of 15% is calculated as the value greater than the true concentration by 3 ppm. Thus, when the water concentration derived in step S140 is 15%, as the NOx concentration after correction, the CPU 97 derives, the value obtained by subtracting 3 ppm as a correction amount from the NOx concentration [ppm] derived in step S170. In this manner, a change in the offset current Ip2offset due to a difference in water concentration can be canceled, and the NOx concentration after correction has a value closer to the true concentration. Such a correspondence relationship between the water concentration and the correction amount to NOx concentration can be determined in advance by an experiment or the like, and stored in the storage section 98. In step S180, the CPU 97 derives a correction amount based on the water concentration and the correspondence relationship, and calculates the NOx concentration after the correction. Note that instead of deriving a correction amount, a correspondence relationship between the NOx concentration and the NOx concentration after correction based on the water concentration and the pump current Ip2 may be stored in the storage section 98, and the NOx concentration after correction may be derived based on the correspondence relationship. Alternatively, the CPU 97 may correct the pump current Ip2 derived in step S170 based on the water concentration, and may derive the NOx concentration based on the pump current Ip2 after correction. These methods also apply correction to the NOx concentration based on the water concentration.

After step S180, or when a concentration derivation timing has not been reached in step S120, the CPU 97 executes the processes in and after S120. The CPU 97 repeatedly measures the water concentration and the NOx concentration in the measurement-object gas by executing the control routine as described above.

The correspondence relationships between the components in this embodiment and the components in the present invention will now be clarified. A layered body obtained by layering six layers consisting of the first substrate layer 1, the second substrate layer 2, the third substrate layer 3, the first solid electrolyte layer 4, the spacer layer 5 and the second solid electrolyte layer 6 in that order corresponds to an element body according to the present invention, the third internal cavity 61 corresponds to a measurement chamber, the measurement electrode 44 corresponds to an inner measurement electrode, the first internal cavity 20 and the second internal cavity 40 correspond to an oxygen concentration adjustment chamber, the auxiliary pump electrode 51 corresponds to an inner adjustment electrode, the main pump cell 21 and the auxiliary pump cell 50 correspond to an adjustment pump cell, the reference electrode 42 corresponds to a reference electrode, the voltage V1 corresponds to an adjustment voltage, the target value V1* corresponds to an adjustment voltage target value, the voltage V2 corresponds to a measurement voltage, the target value V2* corresponds to a measurement voltage target value, the control apparatus 95 corresponds to a control apparatus, and the pump current Ip2 corresponds to a measurement pump current. In addition, the auxiliary pump electrode 51 corresponds to an inner auxiliary pump electrode.

With the gas sensor 100 in this embodiment described in detail above, the control apparatus 95 detects the NOx concentration in the measurement-object gas based on the pump current Ip2 which is caused to flow through the measurement pump cell 41 by the measurement pump control process. The control apparatus 95 performs the water concentration detection process of detecting the water concentration in the measurement-object gas based on the change in the pump current Ip2 which flows during execution of the adjustment pump control process and the measurement pump control process when at least one of the target value V1* or the target value V2* is changed. Thus, the gas sensor 100 in this embodiment can detect the NOx concentration and the water concentration in the measurement-object gas.

Since the control apparatus 95 corrects the NOx concentration in the measurement-object gas based on the water concentration in the measurement-object gas, detected by the water concentration detection process, the accuracy of detection of the specific gas concentration is improved.

Note that the present invention is not limited to the above-described embodiment at all, and may be, of course, implemented in various modes within the technical scope of the present invention.

For example, in the above-described embodiment, in step S130 of the control routine of FIG. 7, the CPU 97 derives the water concentration based on the slope G of the change in the pump current Ip2 when the target value V1* is changed; however, the CPU 97 may derive the water concentration based on the change in the pump current Ip2 instead of the slope G when the target value V1* is changed. For example, the water concentration may be derived based on the amount of change or rate of change in the pump current Ip2 before and after the change in the target value V1*. In this case, a correspondence relationship between the amount of change or rate of change in the pump current Ip2 and the water concentration may be pre-stored in the storage section 98.

In the above-described embodiment, in step S130 of the control routine of FIG. 7, the CPU 97 derives the water concentration based on the slope G of the change in the pump current Ip2 when the target value V1* is changed; however, the CPU 97 may derive the water concentration based on the change in the pump current Ip2 when the target value V2* is changed. For example, the CPU 97 may derive the slope (corresponding to the slope of the straight line shown in FIG. 5 and the value of the vertical axis in FIG. 6) of the change in the pump current Ip2 when the target value V2* is changed without changing the value V1*, and may derive the water concentration based on the derived slope. In this case, a correspondence relationship (corresponding to the linear correspondence relationship shown in FIG. 6) between the slope of the change in the pump current Ip2 and the water concentration when the target value V2* is changed may be pre-stored in the storage section 98. Note that when the target value V2* is changed, the target value V2* may be changed so that the absolute value thereof is increased, or so that the absolute value is decreased. However, each of the values before and after the change is preferably greater than or equal to the target value V2* defined for measurement of the NOx concentration. For example, when the target value V2* before the change is the same as the target value V2* defined for measurement of the NOx concentration, it is preferable that the target value V2* be changed so that the absolute value thereof is increased. In this manner, prevention of the pump current Ip2 from reaching the limiting current due to too low voltage Vp2 can be avoided, thus reduction in the accuracy of measurement of the NOx concentration can be prevented.

In the water concentration detection process, the CPU 97 may derive the water concentration based on the pump current Ip2 when both the target value V1* and the target value V2* are changed. In this case, it is preferable that the direction of change in the pump current Ip2 due to change in the target value V1* be the same as the direction of change in the pump current Ip2 due to change in the target value V2*. For example, when the absolute value of the target value V1* is changed to a smaller value and the absolute value of the target value V2* is changed to a larger value, these changes each causes the pump current Ip2 to increase. Alternatively, when the absolute value of the target value V1* is changed to a larger value and the absolute value of the target value V2* is changed to a smaller value, these changes each causes the pump current Ip2 to decrease. When the target value V1* and the target value V2* are changed by one of these methods, even with a small amount of change in each of the target value V1* and the target value V2*, the change in the pump current Ip2 caused by the water in the measurement-object gas is relatively large. Therefore, the water concentration is easily detected based on the change in the pump current Ip2. Note that when both the target value V1* and the target value V2* are changed, the CPU 97 may calculate, for example, the amount of change or rate of change in the pump current Ip2 instead of the slope of the pump current Ip2, and may derive the water concentration based on the amount of change or rate of change.

In the above-described embodiment, the CPU 97 corrects the NOx concentration using the water concentration, but may not correct the NOx concentration. Alternatively, the CPU 97 may determine whether the derived water concentration is within a predetermined tolerance which is regarded to have no effect on the accuracy of measurement of the NOx concentration, and when the derived water concentration is not within the predetermined tolerance, the CPU 97 may correct the NOx concentration.

Figure 8:
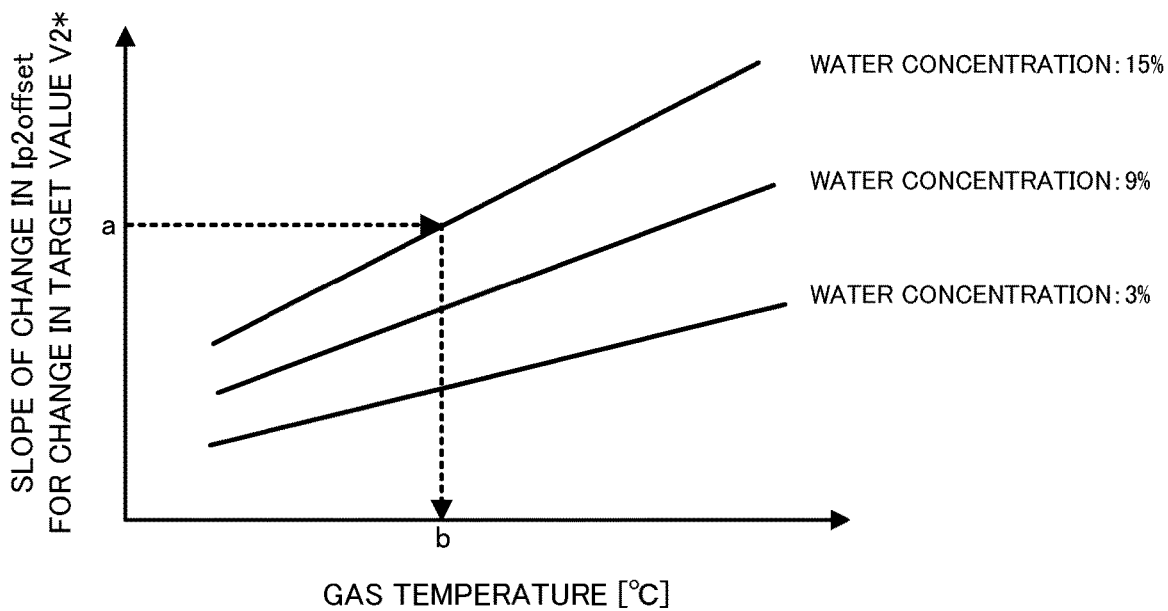
FIG. 8 is a conceptual diagram showing a relationship between water concentration, slope of change in offset current Ip2offset for change in target value V2*, and gas temperature.

In the above-described embodiment, the gas sensor 100 may be configured to further detect the gas temperature of the measurement-object gas. The inventors have found that upon comparison between the change in the pump current Ip2 when the target value V1* is changed and the change in the pump current Ip2 when the target value V2* is changed, the former is unlikely to be affected by the gas temperature of the measurement-object gas. In other words, the inventors have found that the latter is more likely to be affected by the gas temperature than the former, thus the gas temperature in the measurement-object gas can be detected by comparing the former with the latter. FIG. 8 is a conceptual diagram showing a relationship between water concentration, slope of change in offset current Ip2offset for change in target value V2*, and gas temperature. FIG. 6 shows a graph when the gas temperature of each of the first gas to the third gas is the same temperature, whereas FIG. 8 conceptually shows how the slope of the offset current Ip2offset changes according to the gas temperature when the gas temperature of each of the first gas to the third gas is changed. As shown in FIG. 8, it has been identified that even with the same value of water concentration, the value of the slope of the change in the offset current Ip2offset for the change in the target value V2* changes as the gas temperature changes, and the slope tends to increase for higher gas temperature. In contrast, even when the gas temperature changes, no significant change has been observed in the slope of the change in the offset current Ip2offset for the change in the target value V1* if the water concentration has the same value. Such a difference is probably due to the temperature difference between the auxiliary pump electrode 51 and the measurement electrode 44. Although a description is omitted in the above-described embodiment, the gas sensor 100 is configured such that when the heater 72 is at least heated to a temperature in the temperature range of 700° C. or higher and 900° C. or lower, a temperature Tm of the measurement electrode 44 is lower than a temperature Tq of the auxiliary pump electrode 51. For example, when the target temperature of the heater 72 is 800° C., the temperature Tq of the auxiliary pump electrode 51 is approximately 750° C., whereas the temperature Tm of the measurement electrode 44 has a value in the range of 650° C. or higher and 700° C. or lower, for example. The auxiliary pump cell 50 has a greater amount of oxygen to be pumped out than that of the measurement pump cell 41, thus for the purpose of further increasing the pumping ability of the auxiliary pump cell 50, it is set that the temperature Tq>the temperature Tm. Note that for the same reason, the pumping ability of the main pump cell 21 is preferably greater than that of the auxiliary pump cell 50, thus the gas sensor 100 is preferably configured such that temperature Tp>the temperature Tq>the temperature Tm with the heater 72 controlled at a target temperature, where the temperature Tp is the temperature of the inner pump electrode 22. Adjustment of the temperature Tp, the temperature Tq, and the temperature Tm can be made, for example, by adjusting the shape and the arrangement of the heater 72. Since the temperature Tq>the temperature Tm, the temperature Tq of the auxiliary pump electrode 51 is relatively closer to the gas temperature (e.g., 700° C. to 800° C.) of the measurement-object gas, thus even when the gas temperature changes, the temperature Tq is unlikely to change. In contrast, the temperature Tm of the measurement electrode 44 has a large difference from the gas temperature of the measurement-object gas, thus when the gas temperature changes, the temperature Tm is likely to change. Even with the same water concentration, when the temperature Tm rises, the amount of decomposition of water around the measurement electrode 44 increases, thus the change in the offset current Ip2offset for the change in the target value V2* probably increases, in other words, the slope of the offset current Ip2offset probably increases. Thus, the tendency shown in FIG. 8 probably emerges according to the gas temperature. Utilizing these, a gas temperature detection process of detecting the gas temperature of the measurement-object gas can be performed based on the change in the pump current Ip2 when the target value V1* is changed, and the change in the pump current Ip2 when the target value V2* is changed.

A specific example of detection of the gas temperature will be described. First, a relational expression or a map showing a relationship between the water concentration, the slope of the change in the offset current Ip2offset, and the gas temperature shown in FIG. 8 is determined in advance by an experiment, and stored in the storage section 98. The CPU 97 of the control apparatus 95 performs S100 to S140 of the control routine of FIG. 7, and derives the water concentration based on the slope G of the change in the pump current Ip2 when the target value V1* is changed. The water concentration is derived by changing the target value V1*, thus is unlikely to be affected by the gas temperature. Subsequently, the CPU 97 returns the target value V1* to the value before the change, and derives the slope of the change in the pump current Ip2 when the target value V2* is changed. The CPU 97 then derives the gas temperature in the measurement-object gas based on the derived water concentration, the slope of the change in the pump current Ip2 when the target value V2* is changed, and the correspondence relationship stored in the storage section 98. For example, in the case where the correspondence relationship of FIG. 8 is stored in the storage section 98, when the derived water concentration is 15%, and the slope of the change in the pump current Ip2 when the target value V2* is changed has value a, value b is derived as the gas temperature. Thus, with the gas sensor 100, in addition to the NOx concentration of the measurement-object gas and the water concentration, the gas temperature can also be detected. Note that since the water concentration of FIG. 8 corresponds to the water concentration based on the slope G of the change in the pump current Ip2 when the target value V1* is changed, the relationship between the slope G of the change in the pump current Ip2 for the change in the target value V1*, the slope of the change in the pump current Ip2 for the change in the target value V2*, and the gas temperature is also similar to FIG. 8. Thus, the gas temperature can also be derived based on the slope G of the change in the pump current Ip2 for the change in the target value V1*, the slope of the change in the pump current Ip2 for the change in the target value V2*, and the correspondence relationship pre-stored in the storage section 98 instead of using the derived water concentration. Alternatively, the difference or ratio between the slope G of the change in the pump current Ip2 for the change in the target value V1*, and the slope of the change in the pump current Ip2 for the change in the target value V2* may be derived, and the gas temperature can also be derived based on the derived difference or ratio. In this case, a correspondence relationship between the difference or ratio and the gas temperature may be pre-stored in the storage section 98. Alternatively, as described above, the amount of change or rate of change in the pump current Ip2 may be used instead of using the slope.

Figure 9:
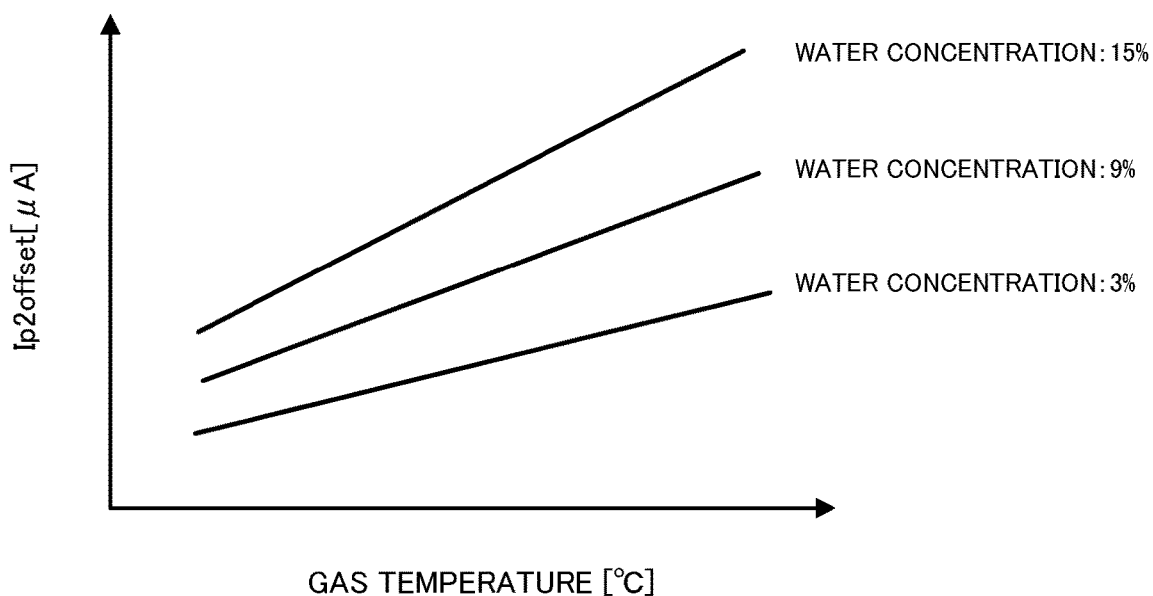
FIG. 9 is a conceptual diagram showing a relationship between water concentration, gas temperature, and offset current Ip2offset.

Furthermore, the control apparatus 95 may correct the NOx concentration in the measurement-object gas based on the derived water concentration and gas temperature. When the gas temperature of the measurement-object gas rises, the amount of decomposition of water around the measurement electrode 44 increases, thus the offset current Ip2offset increases for higher gas temperature. As described above, the offset current Ip2offset also changes depending on the water concentration. Thus, even with the same actual NOx concentration in the measurement-object gas, the pump current Ip2 changes according to the gas temperature and the water concentration of the measurement-object gas, and an error may occur in derived NOx concentration. The occurrence of such as error is prevented, and the accuracy of detection of the NOx concentration is improved by the control apparatus 95 correcting the NOx concentration in the measurement-object gas based on the derived water concentration and gas temperature. When such a correction is made, for example, a correspondence relationship between the water concentration, the gas temperature, and the offset current Ip2offset is studied in advance, and stored in the storage section 98. FIG. 9 is a conceptual diagram showing an example of such a correspondence relationship. The control apparatus 95 derives the offset current Ip2offset based on the derived water concentration, the derived gas temperature, and the correspondence relationship shown in FIG. 9. The control apparatus 95 then corrects the NOx concentration in the measurement-object gas based on the derived offset current Ip2offset. For example, regarding the correspondence relationship between the pump current Ip2 and the NOx concentration, pre-stored in the storage section 98, the value of the offset current Ip2offset at the time of calculation of the correspondence relationship is checked, and stored in the storage section 98 as a reference value. More specifically, except that the NOx concentration in the measurement-object gas is set to 0 ppm, the same condition as at the time of calculation of the correspondence relationship is applied, and the pump current Ip2 in the condition is measured, and its value can be used as a reference value. The control apparatus 95 derives the difference between the derived offset current Ip2offset and the reference value stored in the storage section 98, and uses the difference as the correction amount to the pump current Ip2. The control apparatus 95 derives the value obtained by subtracting the correction amount from the pump current Ip2 obtained in step S160, as the pump current Ip2 after correction. Subsequently, the controller 96 derives the NOx concentration based on the pump current Ip2 after the correction, and the correspondence relationship between the pump current Ip2 and the NOx concentration stored in the storage section 98. Thus, derived NOx concentration is the corrected NOx concentration with the change in the offset current Ip2offset due to the water concentration and the gas temperature canceled, thus has a value closer to the actual NOx concentration, as compared to when correction is not made. Note that instead of the correspondence relationship of FIG. 9, a correspondence relationship between the water concentration, the gas temperature, and the correction amount to the pump current Ip2 may be used. Alternatively, a correspondence relationship between the water concentration, the gas temperature, and the correction amount to the NOx concentration may be used.

With the same value of gas temperature, the correspondence relationship shown in FIG. 9 is such that the offset current Ip2offset tends to increase for higher water concentration. However, without being limited thereto, with the same value of gas temperature, the offset current Ip2offset may tend to decrease for higher water concentration. For example, as seen from FIG. 3 and FIG. 5, when the target value V1* is 400 mV or less and the target value V2* is 350 mV or greater, the offset current Ip2offset tends to increase for higher water concentration. In contrast, when the target value V1* exceeds 400 mV or when the target value V2* is less than 350 mV, the offset current Ip2offset tends to decrease for higher water concentration. Thus, an appropriate correspondence relationship (a correspondence relationship between the water concentration, the gas temperature and the offset current Ip2offset) is preferably checked in advance, and stored in the storage section 98 according to the values of the target value V1* and the target value V2* when the pump current Ip2 for NOx concentration measurement is obtained.

As described above, the change in the pump current Ip2 when the target value V2* is changed is likely to be affected by the gas temperature, thus it is preferable that the water concentration be detected based on the change in the pump current Ip2 when the target value V1* is changed. However, when the gas temperature has less effect on the accuracy of detection of the water concentration, or when the change in the gas temperature of the measurement-object gas is small, a problem is unlikely to arise even when the water concentration is detected based on the change in the pump current Ip2 when the target value V2* is changed.

Although no description is given in the above-described embodiment, the target value V0*, the target value V1*, the target value V2* may be each less than or equal to 900 mV, or less than or equal to 800 mV. In this setting, the voltages Vp0, Vp1, Vp2 can be prevented from reaching a too high value, and eventually, the sensor element 101 can be prevented from being blackened. The target value V1* may be a value in the range of 300 mV or higher and 450 mV or lower. The target value V2* may be a value in the range of 300 mV or higher and 450 mV or lower. Even when the control apparatus 95 changes the value of each of the target value V0*, the target value V1*, and the target value V2* during control of the sensor element 101, it is preferable that the value be changed in the above-mentioned various ranges.

In the above-described embodiment, in and after step S110, the adjustment pump control process and the measurement pump control process are continuously executed, but without being particularly limited thereto, at least one of the adjustment pump control process or the measurement pump control process may be suspended. For example, in step S130, the adjustment pump control process and the measurement pump control process may be suspended, then the adjustment pump control process and the measurement pump control process may be resumed with the target value V1* after the change.

In the above-described embodiment, the oxygen concentration adjustment chamber has the first internal cavity 20 and the second internal cavity 40; however, the configuration is not limited thereto, and for example, the oxygen concentration adjustment chamber may further include another internal cavity, or one of the first internal cavity 20 and the second internal cavity 40 may be omitted. Similarly, in the above-described embodiment, the adjustment pump cell has the main pump cell 21 and the auxiliary pump cell 50; however, the configuration is not limited thereto, and for example, the adjustment pump cell may include another pump cell, or one of the main pump cell 21 and the auxiliary pump cell 50 may be omitted. For example, when the oxygen concentration in the measurement-object gas can be sufficiently reduced by the main pump cell 21 only, the auxiliary pump cell 50 may be omitted. When the auxiliary pump cell 50 is omitted, the controller 96 only needs to perform the main pump control process as the adjustment pump control process. In the main pump control process, the above-described setting of the target value V0* based on the pump current Ip1 may be omitted. Specifically, a predetermined target value V0* may be pre-stored in the storage section 98, and the controller 96 may control the main pump cell 21 by performing feedback control on the voltage Vp0 of the variable power supply 24 so that the voltage V0 reaches the target value V0*. When the auxiliary pump cell 50 is omitted, the inner pump electrode 22 corresponds to an inner adjustment electrode, the voltage V0 corresponds to an adjustment voltage, and the target value V0* corresponds to an adjustment voltage target value. When the oxygen concentration adjustment chamber further includes another internal cavity in addition to the first internal cavity 20 and the second internal cavity 40, and the adjustment pump cell has three or more pump cells, the target value of the voltage in the control process of the most downstream pump cell among the three or more pump cells, in other words, the pump cell disposed closest to the measurement chamber corresponds to an adjustment voltage target value.

Figure 10:
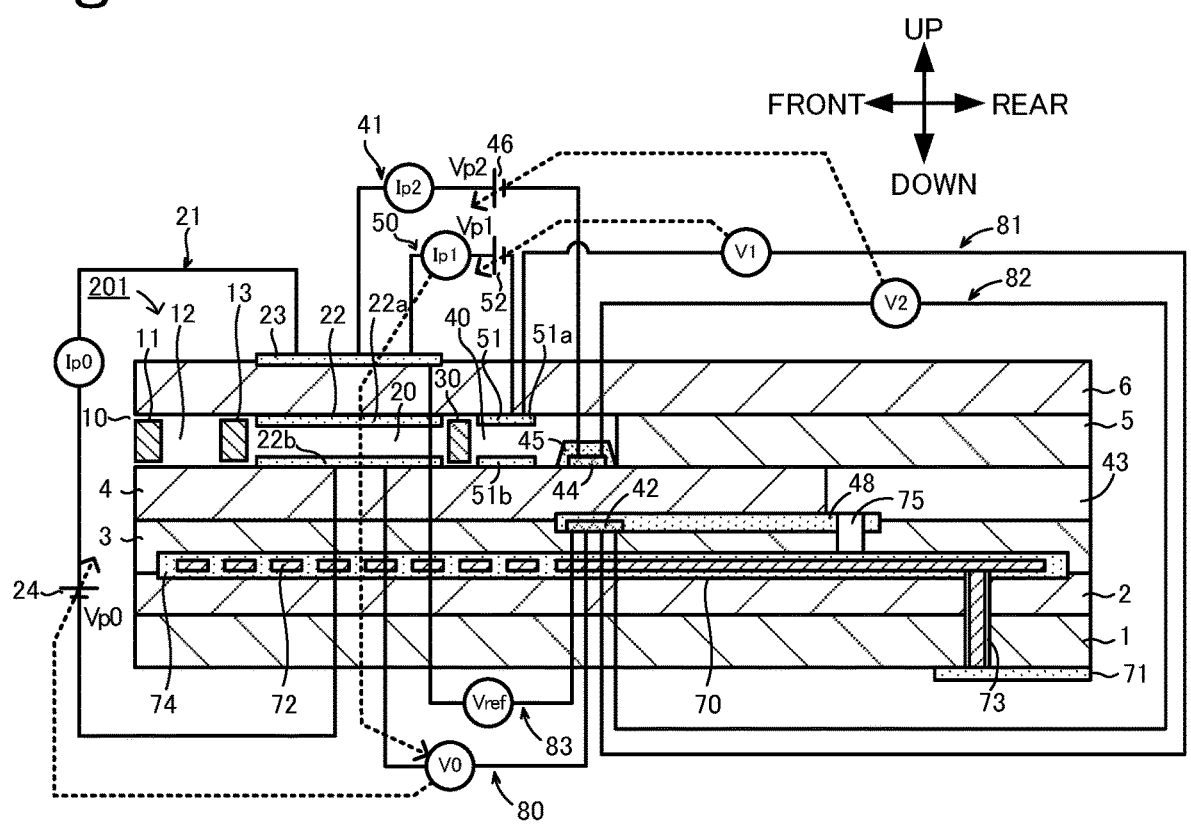
FIG. 10 is a cross-sectional schematic view of sensor element 201 according to a modification.

In the above-described embodiment, the sensor element 101 of the gas sensor 100 includes the first internal cavity 20, the second internal cavity 40, and the third internal cavity 61; however, the configuration is not limited thereto. For example, as in the case of a sensor element 201 of FIG. 10, the third internal cavity 61 may be omitted. In the sensor element 201 of a modification shown in FIG. 10, the gas inlet port 10, the first diffusion controlled portion 11, the buffer space 12, the second diffusion controlled portion 13, the first internal cavity 20, the third diffusion controlled portion 30, and the second internal cavity 40 are formed adjacent to each other in this order between the under surface of the second solid electrolyte layer 6 and the top surface of the first solid electrolyte layer 4 so as to communicate with each other. The measurement electrode 44 is disposed on the top surface of the first solid electrolyte layer 4 in the second internal cavity 40. The measurement electrode 44 is coated with a fourth diffusion controlled portion 45. The fourth diffusion controlled portion 45 is a film made up of a ceramic porous material, such as alumina ($Al_2O_3$). The fourth diffusion controlled portion 45, as well as the fourth diffusion controlled portion 60 of the above-described embodiment, plays a role in limiting the amount of NOx flowing into the measurement electrode 44. The fourth diffusion controlled portion 45 also functions as a protection film for the measurement electrode 44. The ceiling electrode portion 51a of the auxiliary pump electrode 51 is formed up to just above the measurement electrode 44. With the thus configured sensor element 201 as well, it is possible to detect a NOx concentration in accordance with, for example, a pump current Ip2 as in the case of the above-described embodiment. In this case, the surroundings of the measurement electrode 44 function as a measurement chamber.

In the above-described embodiment, the outer pump electrode 23 plays a role as the electrode (also referred to as an outer main pump electrode) to be paired with the inner pump electrode 22 in the main pump cell 21, plays a role as the electrode (also referred to as an outer auxiliary pump electrode) to be paired with the auxiliary pump electrode 51 in the auxiliary pump cell 50, and plays a role as the electrode (also referred to as an outer measurement electrode) to be paired with the measurement electrode 44 in the measurement pump cell 41; however, the configuration is not limited thereto. One or more of the outer main pump electrode, the outer auxiliary pump electrode, and the outer measurement electrode may be provided separately from the outer pump electrode 23 outside the element body so as to be in contact with the measurement-object gas.

In the above-described embodiment, the inner pump electrode 22 is a cermet electrode composed of Pt and $ZrO_2$ and containing 1% of Au, but is not limited thereto. The inner pump electrode 22 may contain a noble metal having a catalytic activity. As the noble metal having a catalytic activity, for example, at least one of Pt, Rh, Ir, Ru or Pd may be mentioned. However, as in the above-described embodiment, the inner pump electrode 22 preferably contains Pt as the noble metal having a catalytic activity. The inner pump electrode 22 preferably contains a noble metal having a catalytic activity and Au. As in the inner pump electrode 22, the auxiliary pump electrode 51 preferably contains a noble metal having a catalytic activity, and further preferably contains Au. When the inner pump electrode 22 and the auxiliary pump electrode 51 contain Au, the catalytic activity for NOx is inhibited, thus reduction of NOx in the first internal cavity 20 and the second internal cavity 40 can be inhibited. The outer pump electrode 23, the reference electrode 42 and the measurement electrode 44 each preferably contain the above-mentioned noble metal having a catalytic activity. The electrodes 22, 23, 42, 44, 51 are each preferably a cermet containing a noble metal and an oxide (e.g., $ZrO_2$) having oxygen ion conductivity, and one or more of these electrodes may not be a cermet. The electrodes 22, 23, 42, 44, 51 are each preferably a porous body, but one or more of these electrodes may not be a porous body.

In the above-described embodiment, the sensor element 101 detects the NOx concentration in the measurement-object gas; however, as long as the sensor element 101 detects the concentration of a specific gas in the measurement-object gas, the configuration is not limited thereto. For example, not only NOx, but also another oxide concentration may serve as the specific gas concentration. When the specific gas is an oxide, as in the above-described embodiment, oxygen is produced when the specific gas itself is reduced in the third internal cavity 61, thus the measurement pump cell 41 can detect the specific gas concentration by obtaining a detection value (e.g., the pump current Ip2) corresponding to the oxygen. Alternatively, the specific gas may be a non-oxide such as ammonia. When the specific gas is a non-oxide, the specific gas is converted to an oxide (for example, ammonia is converted to NO), thereby producing oxygen when the gas after the conversion is reduced in the third internal cavity 61, thus the measurement pump cell 41 can detect the specific gas concentration by obtaining a detection value (e.g., the pump current Ip2) corresponding to the oxygen. For example, the inner pump electrode 22 in the first internal cavity 20 functions as a catalyst, thus ammonia can be converted to NO in the first internal cavity 20. The specific gas may be a predetermined gas other than oxygen. The specific gas may be a predetermined gas other than oxygen and carbon dioxide. The specific gas may be one of NOx and ammonia.

In the above-described embodiment, the element body of the sensor element 101 is a layered body having a plurality of solid electrolyte layers (layers 1 to 6), but is not limited thereto. The element body of the sensor element 101 may include at least one oxygen-ion-conductive solid electrolyte layer. For example, in FIG. 1, the layers 1 to 5 other than the second solid electrolyte layer 6 may be layers (e.g., layers composed of alumina) composed of a material other than that of solid electrolyte layers. In this case, the electrodes of the sensor element 101 may be disposed in the second solid electrolyte layer 6. For example, the measurement electrode 44 in FIG. 1 may be disposed on the lower surface of the second solid electrolyte layer 6. Also, the reference gas inlet space 43 may be provided in the spacer layer 5 instead of the first solid electrolyte layer 4, the reference gas inlet layer 48 may be provided between the second solid electrolyte layer 6 and the spacer layer 5 instead of between the first solid electrolyte layer 4 and the third substrate layer 3, and the reference electrode 42 may be provided rearward of the third internal cavity 61 and on the lower surface of the second solid electrolyte layer 6.

In the above-described embodiment, the controller 96 sets (feedback-controls) the target value V0* of the voltage V0 based on the pump current Ip1 so that the pump current Ip1 reaches the target value Ip1*, and feedback-controls the voltage Vp0 so that the voltage V0 reaches the target value V0*, but may perform another control. For example, the controller 96 may feedback-control the voltage Vp0 based on the pump current Ip1 so that the pump current Ip1 reaches the target value Ip1*. In other words, the controller 96 may omit acquisition of the voltage V0 from the main pump control oxygen partial pressure detection sensor cell 80 and setting of the target value V0*, and may directly control the voltage Vp0 (eventually, control the pump current Ip0) based on the pump current Ip1.

What is claimed is:
1. A gas sensor comprising:
a sensor element including
an element body including an oxygen-ion-conductive solid electrolyte layer and internally provided with a measurement-object gas flow portion that receives a measurement-object gas and causes the measurement-object gas to flow therethrough,
a measurement pump cell constituted by including an inner measurement electrode disposed in a measurement chamber of the measurement-object gas flow portion, the measurement pump cell being configured to pump out oxygen in the measurement chamber to an outside of the element body,
an adjustment pump cell constituted by including an inner adjustment electrode disposed in an oxygen concentration adjustment chamber located upstream of the measurement chamber of the measurement-object gas flow portion, the adjustment pump cell being configured to adjust an oxygen concentration in the oxygen concentration adjustment chamber, and
a reference electrode disposed inside the element body to come into contact with a reference gas which serves as a reference for detection of a specific gas concentration that is a concentration of a specific gas in the measurement-object gas; and
a control apparatus that performs an adjustment pump control process of adjusting the oxygen concentration in the oxygen concentration adjustment chamber by controlling the adjustment pump cell so that an adjustment voltage that is a voltage across the reference electrode and the inner adjustment electrode reaches an adjustment voltage target value, and a measurement pump control process of pumping out oxygen in the measurement chamber by controlling the measurement pump cell so that a measurement voltage that is a voltage across the reference electrode and the inner measurement electrode reaches a measurement voltage target value,
wherein the control apparatus detects the specific gas concentration in the measurement-object gas based on a measurement pump current which is caused to flow through the measurement pump cell by the measurement pump control process, and
the control apparatus performs a water concentration detection process of detecting a water concentration in the measurement-object gas based on a change in the measurement pump current which flows during execution of the adjustment pump control process and the measurement pump control process when at least one of the adjustment voltage target value or the measurement voltage target value is changed.

2. The gas sensor according to claim 1,
wherein in the water concentration detection process, the control apparatus changes an absolute value of the adjustment voltage target value to a small value and changes an absolute value of the measurement voltage target value to a large value, or changes the absolute value of the adjustment voltage target value to a large value and changes the absolute value of the measurement voltage target value to a small value.

3. The gas sensor according to claim 1,
wherein the oxygen concentration adjustment chamber has a first internal cavity, and a second internal cavity provided downstream of the first internal cavity and upstream of the measurement chamber,
the adjustment pump cell has a main pump cell that adjusts an oxygen concentration in the first internal cavity, and an auxiliary pump cell that adjusts an oxygen concentration in the second internal cavity,
the inner adjustment electrode is an inner auxiliary pump electrode that is disposed in the second internal cavity and constitutes part of the auxiliary pump cell, and
the adjustment pump control process includes a main pump control process of controlling the main pump cell to adjust the oxygen concentration in the first internal cavity, and an auxiliary pump control process of controlling the auxiliary pump cell so that the adjustment voltage reaches the adjustment voltage target value.

4. The gas sensor according to claim 1,
wherein the control apparatus corrects the specific gas concentration in the measurement-object gas based on the water concentration in the measurement-object gas, detected by the water concentration detection process.

5. The gas sensor according to claim 1,
wherein the control apparatus performs a gas temperature detection process of detecting a gas temperature of the measurement-object gas based on a change in the measurement pump current which flows during execution of the adjustment pump control process and the measurement pump control process when the adjustment voltage target value is changed, and on a change in the measurement pump current which flows during execution of the adjustment pump control process and the measurement pump control process when the measurement voltage target value is changed.

6. The gas sensor according to claim 5,
wherein the control apparatus corrects the specific gas concentration in the measurement-object gas based on the water concentration detected by the water concentration detection process and the gas temperature detected by the gas temperature detection process.

* * * * *